(12) United States Patent
Bellistri et al.

(10) Patent No.: US 8,386,149 B2
(45) Date of Patent: Feb. 26, 2013

(54) SMALL ENGINE OPERATION COMPONENTS

(75) Inventors: James T. Bellistri, Wildwood, MO (US); Mazen J. Hajji, St. Louis, MO (US); Nagesh S. Mavinahally, Northridge, CA (US); David R. Brower, Townville, SC (US)

(73) Assignee: PC/RC Products, L.L.C., Maryland Heights, MO (US)

( * ) Notice: Subject to any disclaimer, the term of this patent is extended or adjusted under 35 U.S.C. 154(b) by 648 days.

(21) Appl. No.: 12/375,898

(22) PCT Filed: Aug. 1, 2007

(86) PCT No.: PCT/US2007/074982
§ 371 (c)(1),
(2), (4) Date: Dec. 17, 2009

(87) PCT Pub. No.: WO2008/016981
PCT Pub. Date: Feb. 7, 2008

(65) Prior Publication Data
US 2010/0145595 A1    Jun. 10, 2010

Related U.S. Application Data

(60) Provisional application No. 60/834,592, filed on Aug. 1, 2006.

(51) Int. Cl.
*F02M 61/14* (2006.01)
*F02M 61/18* (2006.01)

(52) U.S. Cl. ......................................... 701/103; 123/470

(58) Field of Classification Search .................. 123/470, 123/509, 185.2, 185.3; 701/103, 104, 101; 310/70 R, 216.021; 336/67
See application file for complete search history.

(56) References Cited

U.S. PATENT DOCUMENTS

| | | | | |
|---|---|---|---|---|
| 4,746,825 | A * | 5/1988 | Phelon | 310/70 R |
| 5,174,263 | A * | 12/1992 | Meaney | 123/406.47 |
| 5,682,845 | A | 11/1997 | Woody | |
| 5,816,218 | A * | 10/1998 | Motose | 123/406.18 |
| 5,894,832 | A * | 4/1999 | Nogi et al. | 123/491 |
| 5,979,414 | A * | 11/1999 | Pugh | 123/504 |
| 6,588,407 | B2 * | 7/2003 | Fewell, Jr. | 123/618 |
| 6,647,713 | B1 | 11/2003 | Miyajiri et al. | |
| 6,654,759 | B1 | 11/2003 | Brunet et al. | |
| 6,866,027 | B1 * | 3/2005 | Marchesini et al. | 123/480 |
| 7,069,921 | B1 * | 7/2006 | Kolak et al. | 123/599 |
| 2001/0023685 | A1* | 9/2001 | Nawa et al. | 123/470 |
| 2004/0025837 | A1* | 2/2004 | Hunt et al. | 123/339.27 |
| 2004/0135014 | A1* | 7/2004 | Sekine et al. | 239/585.1 |

* cited by examiner

*Primary Examiner* — Mahmoud Gimie
(74) *Attorney, Agent, or Firm* — Polster Lieder Woodruff & Lucchesi, L.C.

(57) ABSTRACT

A low pressure, low cost electronic fuel injection system (18) for small hand-held two cycle engines (1) is provided which employs a number of improvements, including by way of example and not of limitation, an improved low cost injector construction (45), a throttle body integration (10) that includes mounting the operational components of the supply system on a single unit, an improved ignition module (40), a pressure regulated fuel system controlled by an electronic control unit (42) employing and an adaptive algorithm based on engine speed which controls the speed by varying the amount of fuel provided to the engine.

16 Claims, 24 Drawing Sheets

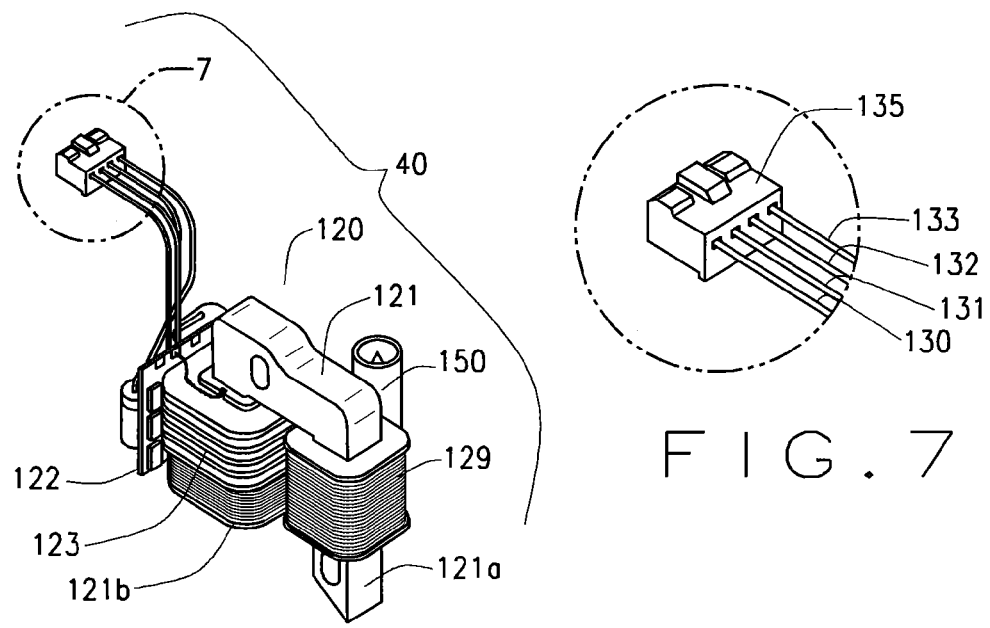
FIG.6
FIG.7
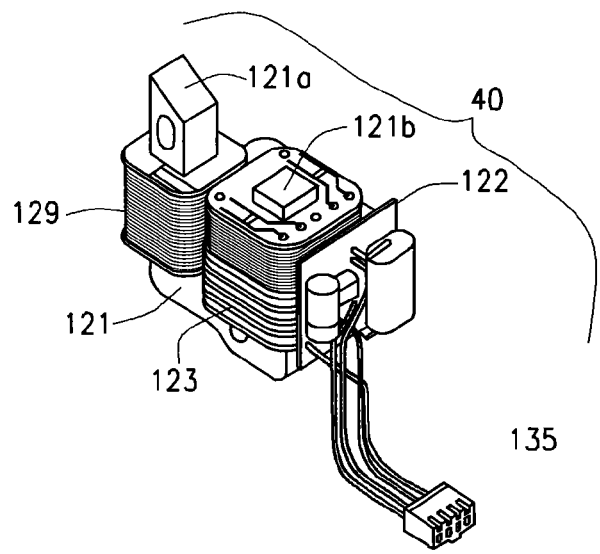
FIG.8
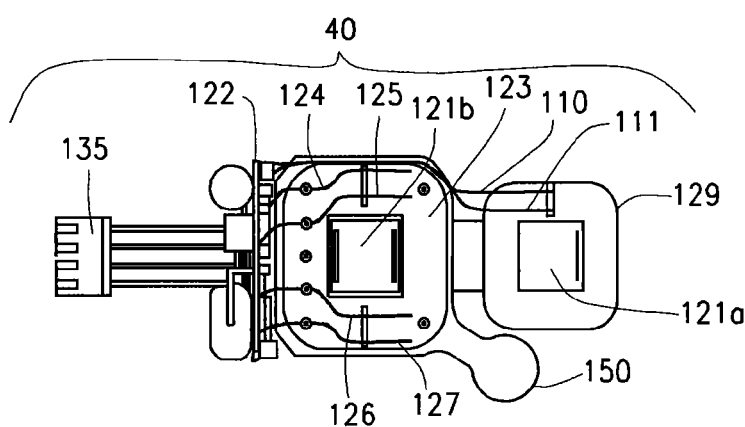
FIG.8A

SMALL ENGINE OPERATION COMPONENTS

RELATED APPLICATIONS

This application is a United States national phase under 35 USC §371 of PCT/US2007/074982, filed Aug. 1, 2007, which claims the benefit of U.S. Provisional Application Ser. No. 60/834,592, filed on Aug. 1, 2006, both of which are incorporated herein by reference.

STATEMENT REGARDING COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND ART

This invention relates generally to an electronic fuel regulation system, and more particular, to an electronic fuel regulation system for small internal combustion engines, which in the preferred embodiment are hand-held garden implements utilizing a conventional two-cycle engine design. The invention may also be used in other small internal combustion engines and in other applications, such as in a four stroke engine and/or non-hand-held applications. While the invention is described in detail with respect to those applications, those skilled in the art will recognize the wider applicability of the inventive aspects described herein.

Small gasoline engines presently have wide application, being ubiquitous in the marketplace for a variety of applications, including, for example, hedge trimmers, blowers and lawn edgers. The standard fuel delivery system for such engines currently is a somewhat simplified carburetor based system. However, such carburetor based systems are relatively fuel inefficient, resulting in undesirable levels of emissions caused by engine operations that generate excessive hydrocarbons and evaporative emissions. Additionally, carburetor based systems usually require high maintenance and are difficult to adjust for maximum efficiency. Carburetor based systems also can be hard to start in certain conditions and are difficult to operate in normal use. The starting problem is particularly evident with small two cycle engines employed with edgers and blowers, for example, whose overall designs, normally of a rope pull nature, make starting the engines difficult, even when the fuel systems are fully functional.

To rectify some of the problems associated with carburetor based fuel delivery systems, a number of attempts have been made to design fuel management systems for the engines. These attempts usually have involved fuel injector based systems. Often, the fuel injection systems are simply scaled down versions of conventional automobile fuel injection technology. In addition, the application of the technology to relatively low cost hand-held implements has heretofore been hindered by the excessive costs associated with the fuel systems. To control the fuel delivery and fuel mixture in previously known fuel injector based systems, various timing and sensing components are required. This complexity has resulted in substantial cost, and merely adopting or scaling prior art solutions to the problem has not resulted in commercially viable systems for smaller applications. Certain prior art designs are directed at lowering costs. In particular, it is noted that U.S. Pat. No. 6,343,596 ("the '596 patent" hereinafter), assigned to the assignee of the present invention, has achieved success in that regard. The '596 patent is incorporated herein by reference. As indicated, the '596 patent works well for its intended purpose, but is not adaptable to low cost, small gasoline engines to which the present disclosure applies. While the '596 patent includes a microprocessor, a thermocouple, exhaust gas temperature sensor, and a fuel regulating valve installed in a low-pressure fuel delivery system between the fuel tank and the carburetor, the application of that technology to smaller engines is cost prohibitive in the form described in the '596 patent. In order to overcome the cost problems to which the present disclosure is directed, a number of innovative designs were employed, as more fully described in the following specification and accompanying drawings. The designs include a low cost injector, which is shrunk in size to facilitate use in its intended application and a simplified method of adjusting the injector for mass projection. The carburetor of the prior art convention systems is replaced by a throttle body in which we have mounted an electronic control unit (ECU) which receives input from a throttle position sensor. The throttle body also has provisions for an intake air temperature sensor passage, a pump, a fuel pressure regulator, a diagnostic port and the injector described above. The fuel pressure regulator is adapted to provide a constant fuel pressure and allow for easy prime of the system at all times, with excess fuel being pushed or returned to the fuel tank through the throttle body.

In order to ignite the fuel provided by the operation of the fuel regulation system, an ignition module is provided in which a power generation and spark control advanced circuitry is integrated on the ignition module board. As indicated, the electronic control unit is positioned on the throttle body, and variable spark advance is controlled through the electronic control unit. The ignition module includes the capability of providing additional DC power for battery charging, if desired. Finally, an adaptive algorithm based on speed of the engine, prime start and what is referred to hereinafter as smart choke positioning utilizes the electronic control unit to provide operational commands to this system.

SUMMARY OF THE INVENTION

One feature of this disclosure is a fuel system for a small internal combustion engine.

Another of the features of this disclosure is a low cost injector adaptable for use in low pressure electronic fuel injection systems on small gasoline engines.

Another feature of the disclosure is a throttle body which is designed for component integration and mounts an electronic control unit adapted to receive inputs from suitable sensors, a low pressure pump for providing pressurized fuel for the system, a fuel pressure regulator, and the injector for injecting fuel.

Another feature of the disclosure is a separate ignition module which provides power generation using a two-leg lamination stack.

Yet another feature of the disclosure is power generation and spark advance circuitry integrated on a single ignition module board. The ignition module, in the embodiment illustrated, provides variable spark advance controlled through the electronic control unit. The ignition module includes the capability of providing DC power for battery charging.

Still a further feature of the disclosure is the provision of a fuel pressure regulator integrated with the throttle body which includes a hand operated pump, the pump being actuated to provide low pressure fuel to the injector, purging air and providing primary pressure to the system. The fuel pressure regulator is employed in conjunction with the pump and the throttle body provides for a return of excess fuel to the fuel tank under certain operational conditions.

Another feature of the disclosure is an adaptive algorithm relying primarily on rotational speed which quickly adjusts fuel duration provided to the engine so that engine speed quickly adjusts to conditions of use. A particular feature of the preferred embodiment is a use of a smart choke algorithm which adjusts timing in accordance with predetermined conditions.

Another feature of the disclosure is an improved method for determining top dead center (TDC) for firing a spark plug for the engine by utilizing a unique cycle recognition procedure.

Other features of the present disclosure illustratively described herein will be in part apparent and in part pointed out hereinafter.

The foregoing and other objects, features, and advantages of the disclosure as well as presently preferred embodiments thereof will become more apparent from the reading of the following description in connection with the accompanying drawings.

BRIEF DESCRIPTION OF THE DRAWINGS

In the accompanying drawings which form part of the specification:

FIG. 1 a is a block diagram view of the fuel system employed with the embodiment of FIG. 1;

FIG. 3 is a view in perspective of the throttle body assembly shown in

FIG. 2 in an assembled form;

FIG. 6 is a view in perspective of one illustrative embodiment of ignition module utilized in connection with the preferred embodiment of the system of the present disclosure;

FIG. 7 in an enlarged view taken along the line 7-7 of FIG. 6;

FIG. 8 is a view in perspective illustrating the lamination stack and the transformer assembly of the ignition module shown in FIG. 6;

FIG. 8a is a bottom plan view of the ignition module shown in FIG. 8;

FIG. 14 is a sectional view taken along the line 14-14 in FIG. 13a;

Corresponding reference numerals indicate corresponding parts throughout the several figures of the drawings.

BEST MODE FOR CARRYING OUT THE INVENTION

Figure 1:
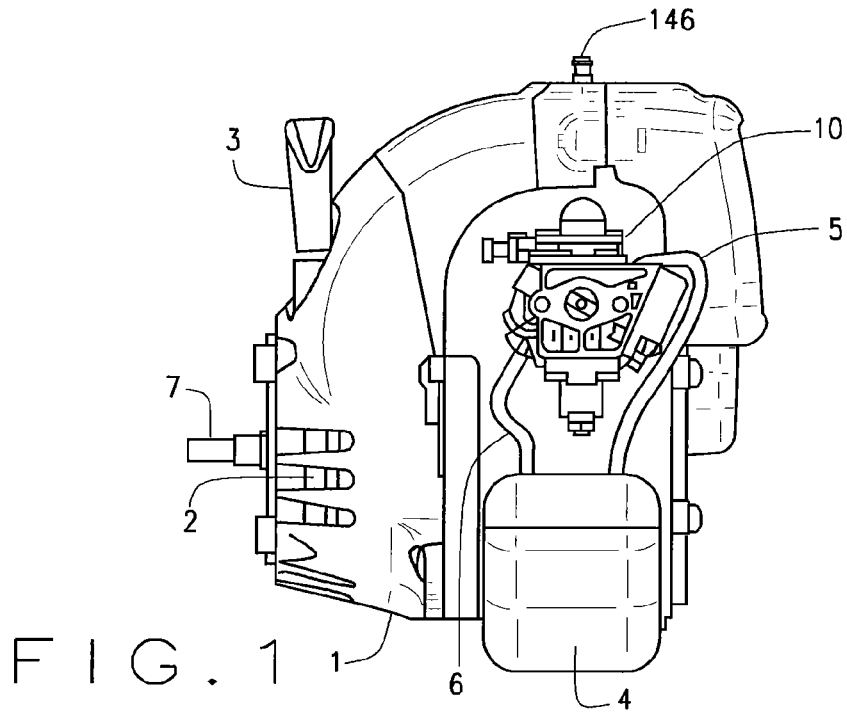
FIG. 1 is a view in perspective, partly broken away, of one illustrative hand-held implement engine in which the fuel system of present disclosure finds application.

The following detailed description illustrates the present disclosure by way of example and not by way of limitation. It should be understood that various aspects of the disclosure may be implemented individually or in combination with one another. The description clearly enables one skilled in the art to make and use the development which we believe to be new and unobvious, describes several embodiments, adaptations, variations, alternatives, and uses of the system, including what is presently believed to be the best mode of carrying out the inventive principles described in this specification. When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

In general, a fuel system for an internal combustion engine is disclosed, the engine including an engine block at least one combustion chamber associated with the engine block, at least one piston mounted for movement within the chamber, a shaft driven by pistons, and a flywheel mounted to and rotatable with the shaft. The system includes a throttle body mounted to the engine, the throttle body having a plurality of openings serving to route fuel to the combustion chamber; a fuel pump is mounted to throttle body; a fuel pressure regulator is associated with fuel pump and mounted to throttle body. An electronic control unit (ECU) is mounted to the throttle body, the electronic control unit being operatively connected to a fuel injector for injecting fuel into the at least one combustion chamber; and a fuel injector mounted to the throttle body.

In one aspect, a fuel system for an internal combustion engine is described including an engine block, at least one combustion chamber associated with the engine block, at least one piston mounted for movement within the chamber, a shaft driven by the at least one piston, and a flywheel mounted to and rotatable with the shaft; the fuel system comprising a throttle body mounted to the engine, the throttle body having a plurality of openings in it, the openings serving to route fuel to the at least one combustion chamber; a fuel pump mounted to the throttle body; a fuel pressure regulator is associated with the fuel pump and mounted to the throttle body; an electronic control unit (ECU) is mounted to the throttle body, the electronic control unit being operatively connected to a fuel injector for injecting fuel into the at least one combustion chamber; a fuel injector is mounted to the throttle body; an air purge pump is mounted to the throttle body; and an ignition module and power generating assembly are operatively associated the flywheel of the engine, the power generating assembly producing sufficient electrical power for operating the injection system along with associated input signals to the electronic control unit for determining ignition and injector triggering.

In another aspect, a fuel system for a small internal combustion engine is described, the engine including an engine block, at least one combustion chamber associated with the engine block, at least one piston mounted for movement within the at least one chamber, a shaft driven by the at least one piston, a flywheel mounted to and rotatable with the shaft and at least on fuel injector associated with the engine, a throttle body mounted to the engine, and a fuel pump integral with the throttle body, the throttle body having a fuel circuit associated with it for delivering fuel to the at least one fuel injector, the fuel injector including a magnetic core an electrical coil mounted to the core, an upper body sized to receive the motor can, a lower body having an inlet opening operatively connected to the fuel circuit and an outlet operatively connected to the at least one combustion chamber, the lower body being mounted to and fixed in position to the upper bod in the assembled position of the injector, a spring and a pin positioned between the lower body and the motor can, the pin being movable with respect to the magnetic forces acting on it from the coil, the coil being electrically connected to the electronic control unit, wherein assembly of the injector allows the motor can and pin to be adjusted with respect to one another by means of the internal threaded section to define a first position (closed), and a second open position by adjustment of the motor can to define both a second position and the distance of travel for the pin.

In another aspect, a fuel system for a small internal combustion engine is provided, the engine having an engine block, at least one combustion chamber associated with the engine, at least one piston mounted for movement within the combustion chamber, a shaft driven by the at least one piston, and a flywheel mounted to the shaft, and at least one fuel injector, an electronic control unit being operable to electrically control a fuel injector for the fuel system, the electronic control unit including a microprocessor, a non-volatile memory for a control algorithm, and signal conditioning circuits, the electronic control unit being mounted to a throttle body, and a throttle body mounted to the engine wherein the electronic control unit determines a speed of the engine, determines whether the speed of the engine is greater than a maximum speed, determines whether the speed of the engine is greater than an upper limit speed, the upper limit speed being greater than the maximum speed increases fuel flow to the engine if the speed of the engine is greater than the maximum speed and less than the upper limit speed, slows the speed of the engine by shutting off the fuel flow to the engine and stopping the ignition timing to prevent the speed of the engine from exceeding the upper limit speed if the speed of the engine is greater than the upper limit speed and makes no change to the fuel flow in response to the testing steps if the speed of the engine is less than the maximum speed.

Also disclosed is a fuel circuit for an internal combustion engine comprising a throttle body including a housing with at least one channel formed in it to deliver fuel to a fuel injector; a throttle plate mounted to the throttle body a fuel injector positioned with respect to the throttle plate to enable the injector to deliver fuel to the combustion chamber; a diaphragm mounted to the throttle body with a first side adapted to alternately receive a vacuum and a positive pressure and a second side adapted to draw and expel fuel in response to the vacuum and positive pressure; and an inlet disk valve disposed with the housing, fuel being pulled through the inlet disk valve by the second side of the diaphragm; wherein the inlet disk valve comprises an inlet opening disposed away from the diaphragm, a disk comprising a first side and a second side, the first side being adapted to seal the inlet opening, and a spring disposed against the second side of the disk adapted to bias the disk against the inlet opening.

In one aspect, the fuel system includes a fuel tank with the fuel pump having an input side connected to the fuel pump and an output side operatively connected through the throttle body to the fuel injector and to the fuel tank, whereby excess fuel is returned to the fuel tank.

A fuel system is disclosed having a throttle body housing, the diaphragm pump being mounted on the throttle body housing and an injector in fluid communication with the diaphragm pump, the injector supplying fuel to a combustion chamber, wherein fuel is supplied from the diaphragm pump to the injector through a passage in the throttle body housing, the passage being characterized by the absence of a pressure regulator to release fuel pressure; a fuel tank physically separated from the throttle body housing, a supply line being connected to the fuel tank and the diaphragm pump to supply fuel to the diaphragm pump and a return line being connected to the passage in the throttle body housing and the fuel tank to return fuel to the fuel tank; and a pressure regulator disposed along the return line, the pressure regulator being physically separated from the throttle body housing and being adapted to release fuel pressure from the passage in the throttle body housing.

A fuel system is disclosed including a diaphragm with a first side adapted to alternately receive a vacuum and a positive pressure and a second side adapted to draw and expel fuel in response to the vacuum and the positive pressure; an inlet disk valve disposed within a throttle body housing, fuel being pulled through the inlet disk valve by the second side of the diaphragm, wherein the inlet disk valve comprises an inlet opening disposed away from the diaphragm, a disk comprising a first side and a second side, the first side being adapted to seal the inlet opening, and a spring disposed against the second side of the disk adapted to bias the disk against the inlet opening; an outlet disk valve disposed within the throttle body housing, fuel being pushed through the outlet disk valve by to the second side of the diaphragm, wherein the outlet disk valve comprises an inlet opening disposed away from the diaphragm, a disk comprising a first side and a second side, the first side being adapted to seal the inlet opening, and a spring disposed against the second side of the disk adapted to bias the disk against the inlet opening; an angular passage through the throttle body housing directing fuel from the inlet disk valve to the inlet opening of the outlet disk valve; an inlet flapper valve disposed adjacent the inlet disk valve and away from the inlet opening of the inlet disk valve; and an outlet flapper valve disposed adjacent the outlet disk valve and away from the inlet opening of the outlet disk valve.

A method of operating a fuel system also is disclosed comprising determining a throttle position and providing fuel to the engine in response to an operating speed algorithm when the throttle position is above a transition and in response to an idle speed algorithm when the throttle position is below the transition; testing whether the speed of the engine is less than a lower speed boundary in the idle speed algorithm and changing a fuel flow to the engine by changing an amount of time an injector is open during each cycle if the speed of the engine is below the lower speed boundary to increase the speed of the engine above the lower speed boundary; and testing whether the speed of the engine is greater than an upper speed boundary in the idle speed algorithm and changing a fuel flow to the engine by changing the amount of time the injector is open during each cycle if the speed of the engine is above the upper speed boundary to decrease the speed of the engine below the upper speed boundary; decreasing the fuel flow to the engine in the idle speed algorithm if the speed of the engine is less than the lower speed boundary and testing whether the speed of the engine decreased or increased in response to the fuel flow decrease; and increasing the fuel flow to the engine in the idle speed algorithm if the speed of the engine is above the upper speed boundary and testing whether the speed of the engine decreased or increased in response to the fuel flow increase.

An internal combustion engine is described comprising a flywheel comprising a magnet attached thereto; an ignition module mounted adjacent the flywheel, the ignition module comprising a first leg and a second leg wherein a power generation coil assembly is mounted on the first leg and a transformer assembly is mounted on the second leg; a battery connected to the power generation coil assembly (129); and an electrical load connected to the battery.

In one aspect, a fuel system for an internal combustion is disclosed, the engine having an engine block, at least one cylinder, at least one piston mounted for movement within the cylinder, a shaft driven by the at least one piston, a flywheel mounted to the shaft and a fuel circuit for supplying fuel to the cylinder. a fuel injector capable of delivering fuel in less than 4 ms at an engine speed of less than 12,500 revolutions per minute including a motor can enclosing a magnetic core, an electrical coil mounted to the core, an upper body sized to receive the motor can, a lower body having an inlet operatively connected to the fuel circuit and an outlet operatively connected to the at least one cylinder, the lower body being mounted to and fixed in position to the upper body in the assembled position of the injector, a spring and pin positioned between the lower body and the motor can, the spring acting on the pin normally to position the pin toward the outlet of the lower body.

In one aspect, the electronic control unit has a plurality of sensors associated with it.

In another aspect, a fuel system for a small internal combustion engine is disclosed, the engine having an engine block, at least one combustion chamber associated with the engine, at least one piston mounted for movement within the combustion chamber, a shaft driven by the at least one piston, and a flywheel mounted to the shaft, and at least one fuel injector; an electronic control unit being operable to electrically control a fuel injector for the fuel system and including a microprocessor, a non-volatile memory for a control algorithm, and signal conditioning circuits, the electronic control unit being mounted to a throttle body, and a throttle body mounted to the engine.

In another aspect, a throttle body for an internal combustion engine is provided comprising a housing having a plurality of channels formed in it, at least one of said channels operating to deliver fuel to a fuel injector; an electronic control unit mounted to the throttle body; a throttle plate operatively connected to the electronic control unit, the throttle plate including a shaft having a first end and a second end, one of said first and of said second ends of the shaft being operatively connected to the electronic control unit so as to provide a throttle position indication to the electronic control unit; and a fuel injector attached to the engine and electronically connected to the electronic control unit.

In one aspect the fuel injector being positioned downstream of the throttle plate.

In another aspect, a method of adjusting the operational position of a fuel injector for an internal combustion engine comprising providing a fuel injector having an upper body and a lower body, the upper body including a motor can movable with respect to the lower body; advancing the motor can to define a first bottomed position with respect to the lower body; and rotating the motor can away from the bottomed position to define an operational range of motion for the injector.

Also provided is method for starting a rope pull start internal combustion engine having a flywheel, a fuel injection system, an electronic control unit for operating the fuel injection system, the electronic control unit having a smart choke algorithm and a run algorithm associated with it, and an ignition module for detecting rotation of the flywheel comprising: pulling the rope to cause rotation of flywheel; generating a power signal in the ignition module; transferring power from the ignition module to the electronic control unit; starting a smart choke algorithm in the electronic control unit; providing a throttle position indication to the smart choke algorithm; providing an intake air temperature indication to the smart choke algorithm; providing an engine temperature indication to the smart choke algorithm; utilizing the sensor inputs to indicate a point in a look up table to determine the on time for the fuel injection system; applying fuel from the fuel injection system to the engine based on the lookup table values for starting the engine prior to the completion of the loading of the run algorithm; and completing the run algorithm loading and transferring the fuel injection system operation from the smart choke algorithm to the run algorithm.

More specifically, referring to FIG. 1, reference numeral 1 indicates one illustrative embodiment of a hand-held two-cycle engine in which the preferred embodiment of this specification as described below finds application. As indicated above, the engine 1 finds general application in a variety of hand held tools, including by way of example and not of limitation, blowers, trimmers, and edgers among other products sold to the general public by a number of manufacturers under a variety of trademarks. Additional application of this technology can be applied readily to scooters and mopeds, for example.

Figure 9:
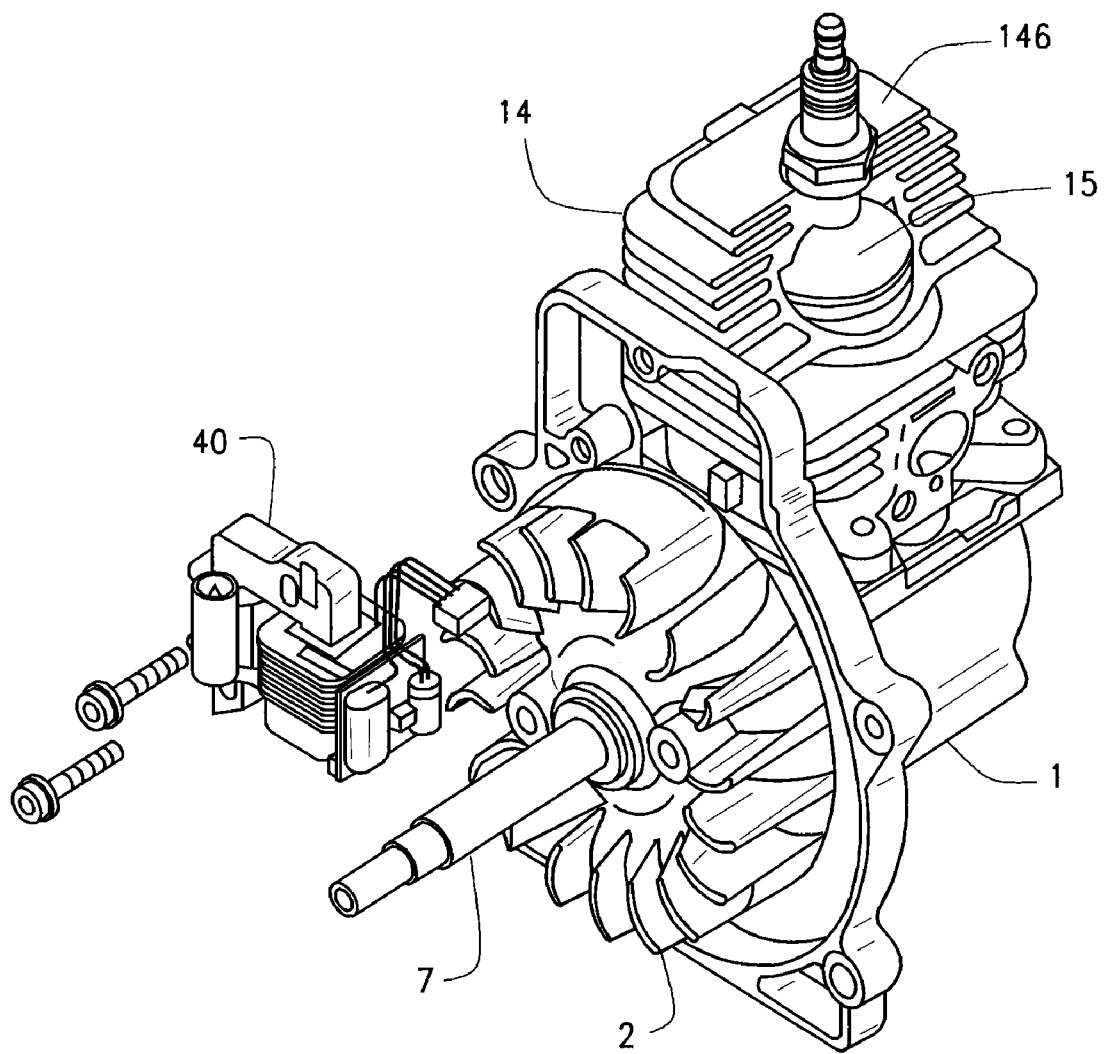
FIG. 9 is a view in perspective, partly broken away, of one illustrative mounting position of the ignition module of FIG. 6 with respect to the engine shown in FIG. 1.
Figure 10:
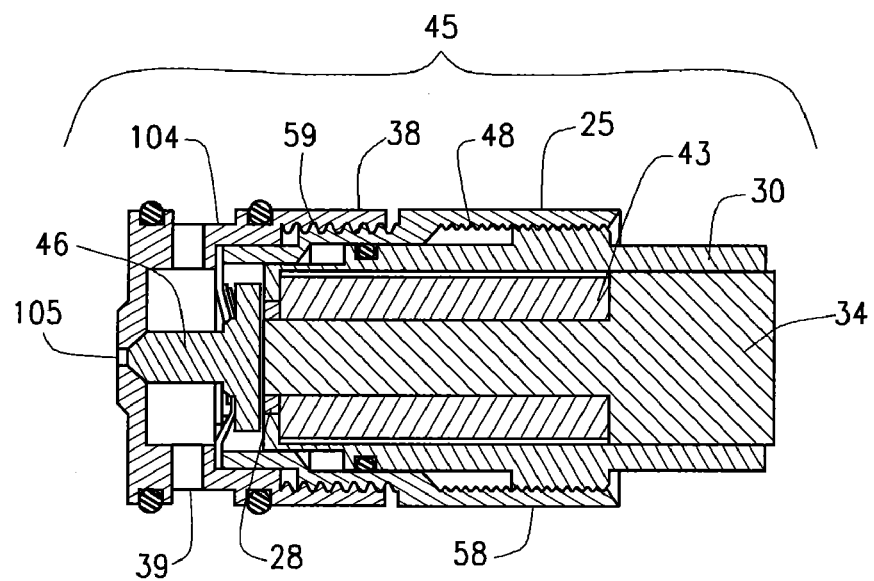
FIG. 10 is a sectional view of one illustrative embodiment of injector employed with the fuel system of the present disclosure.
Figure 11:
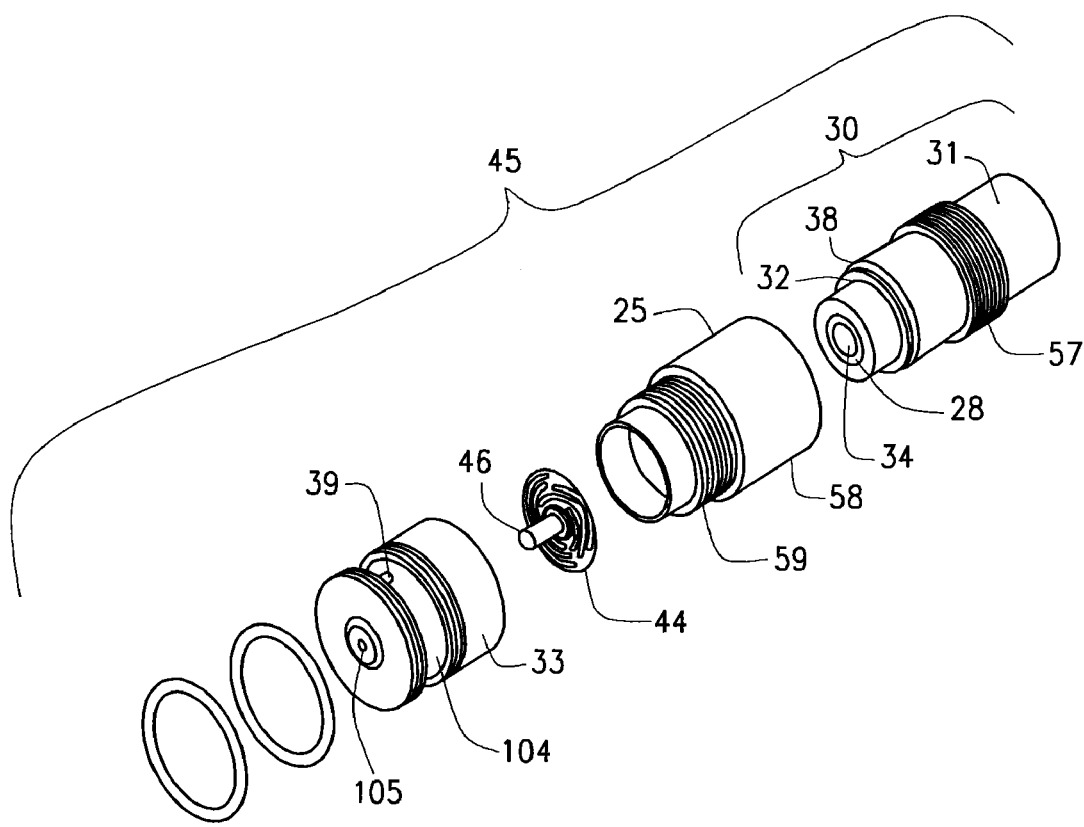
FIG. 11 is an exploded view of the injector shown in FIG. 10.
Figure 12:
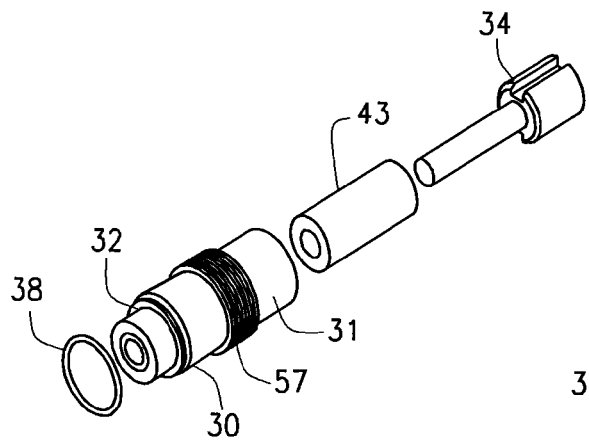
FIG. 12 is an exploded view of the drive components for the injector shown in FIG. 10.
Figure 13:
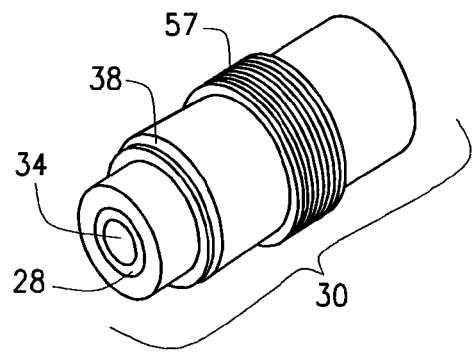
FIG. 13 is a assembled view in perspective of the drive components shown in FIG. 12.
Figure 13A:
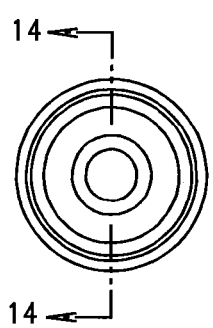
FIG. 13a is an end view of the drive components shown in FIG. 13.

In particular, the present disclosure is intended to replace a carburetor system of prior art devices, and to achieve that replacement within the overall design silhouette of the prior art product configurations. The engine 1 has an engine block 12 containing a piston 11, and includes a fly wheel 2 (FIG. 9) attached to a crank shaft 7, which is initially operated by pulling on a handle 3 during engine start. Because of the unique features of the present disclosure, we have consistently operated the engine 1 utilizing one or two pulls on the handle 3 in order to achieve engine 1 starting status. The illustrative example of the device in which the engine 1 finds application includes a fuel tank 4 having a supply line 5 from and a return line 6 to the tank 4. The supply line 5 is operatively connected to a throttle body 10 and associated components, the integration of which is described in greater detail below.

Figure 1A:
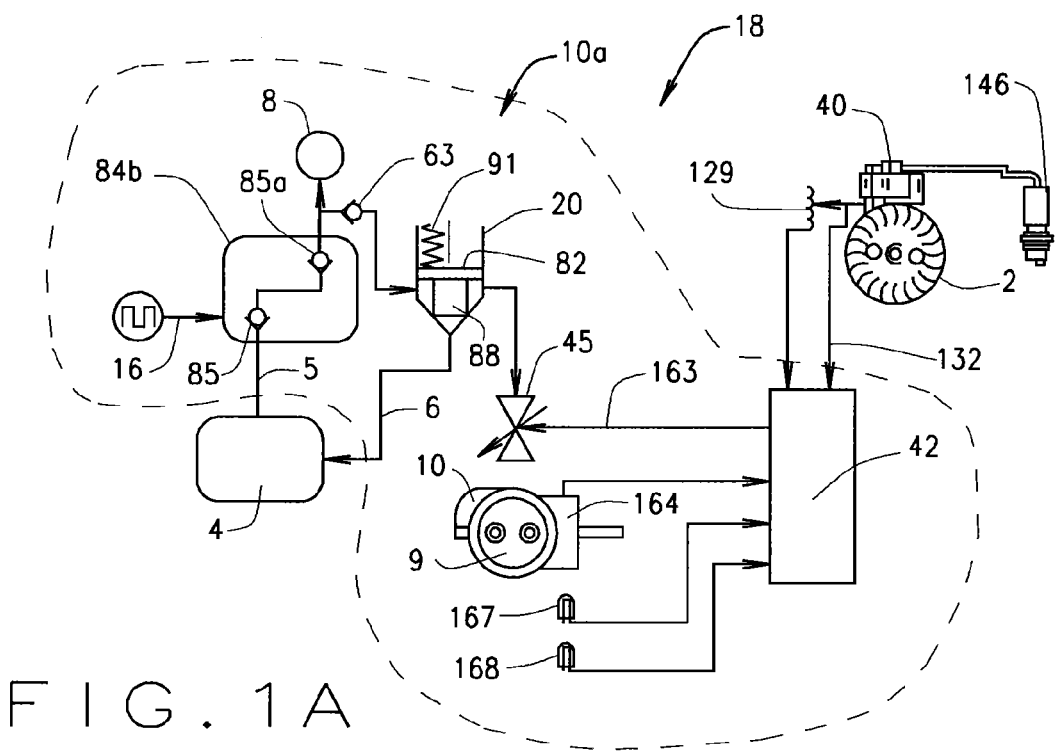

A block system diagram of one illustrative embodiment of fuel system 18 of the present disclosure is shown in simplified form in FIG. 1a. In general, a low pressure fuel supply is provided, which includes the tank 4. The supply line 5 is connected to the tank 4 for supplying fuel to a fuel pump assembly 84b. The fuel pump 84b pumps fuel utilizing crankcase pulsations received through a crankcase pulse port 16 located in the throttle body 10. The pulsations are delivered to the pulse port 16 preferably through a passage created between the engine 1 and throttle body 10. The fuel is routed through the pump 84b by means of an inlet check valve 85 and an outlet check valve 85a. In the preferred embodiment illustrated, an air purge bulb or pump 8 is provided to purge excess air from the system and pressurize the fuel system. The purge pump 8 is connected to the system 18 by a check valve 63 which facilitates fluid movement through the system into a fuel pressure regulator assembly 20. The fuel pressure regulator assembly 20 comprises what is known in the art as a downstream fuel pressure regulator. While a downstream fuel pressure regulator is preferred, other embodiments may utilize an upstream regulator. In the embodiment shown, the fuel pressure regulator assembly 20 bleeds off excessive fluid when a predetermined pressure is overcome. When pressure is low, the regulator stops fuel flow from returning to the tank 4 until the pressure is greater than the set pressure. The fuel pressure regulator 20, in the embodiment illustrated, includes a diaphragm 82, which is used to regulate fuel flow. The diaphragm 82 has a needle 88 associated with it. Depending upon pressure within the system, the fuel pressure regulator 20 returns excess fuel to the fuel tank 4. As will be appreciated by those skilled in the art; other embodiments of the devices disclosed herein may not utilize the bulb 8 to prime the fuel system. The output side of the regulator assembly 20 is an input to a fuel injector 45. The injector 45 in turn supplies fuel to a combustion chamber 14 of a cylinder 15 for the engine 1 (see FIG. 9).

Figure 2:
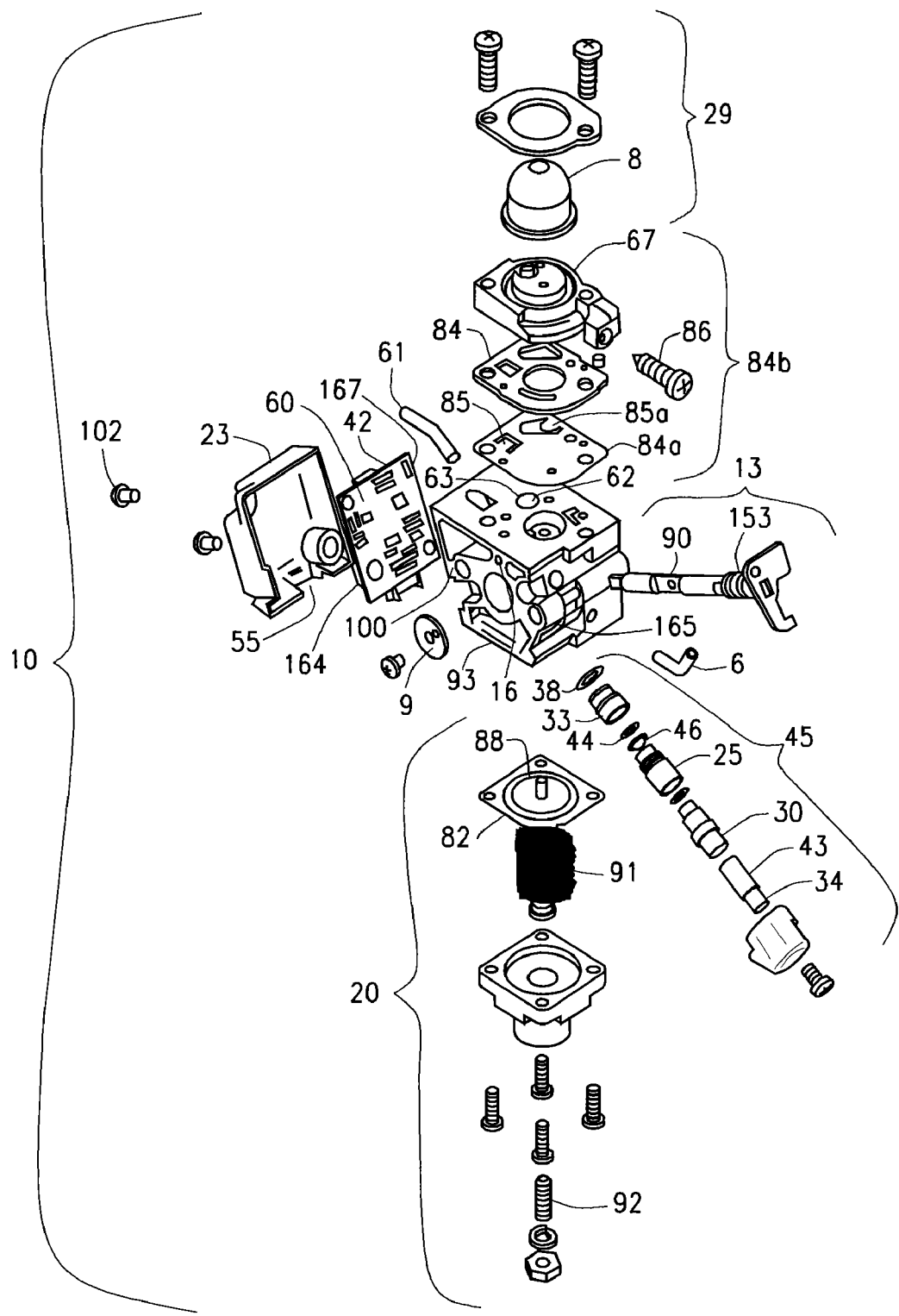
FIG. 2 is an exploded view in perspective of one illustrative embodiment of throttle body of the present disclosure illustrating the integration of various features in connection with the throttle body design.
Figure 3:
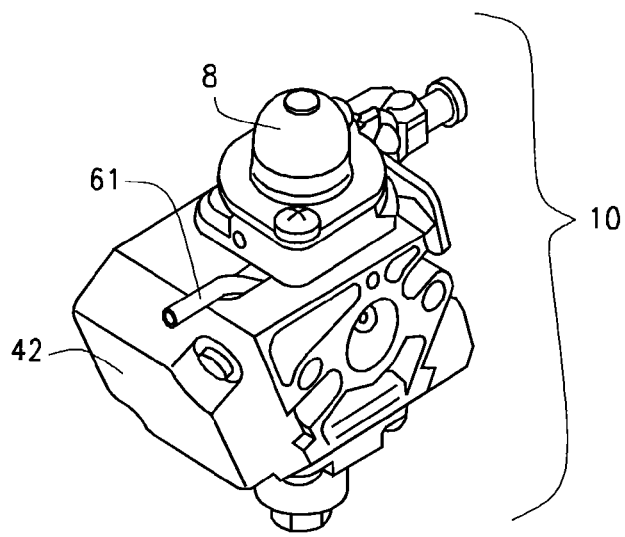
Figure 4:
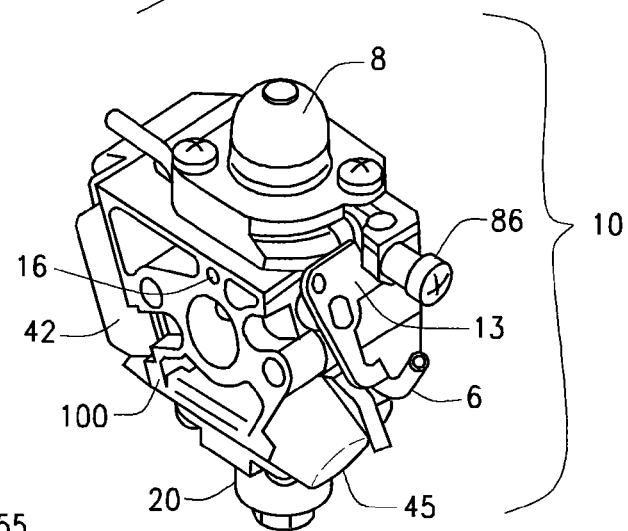
FIG. 4 is a view in perspective illustrating a portion of the Throttle control for the embodiment shown in FIG. 2.
Figure 5:
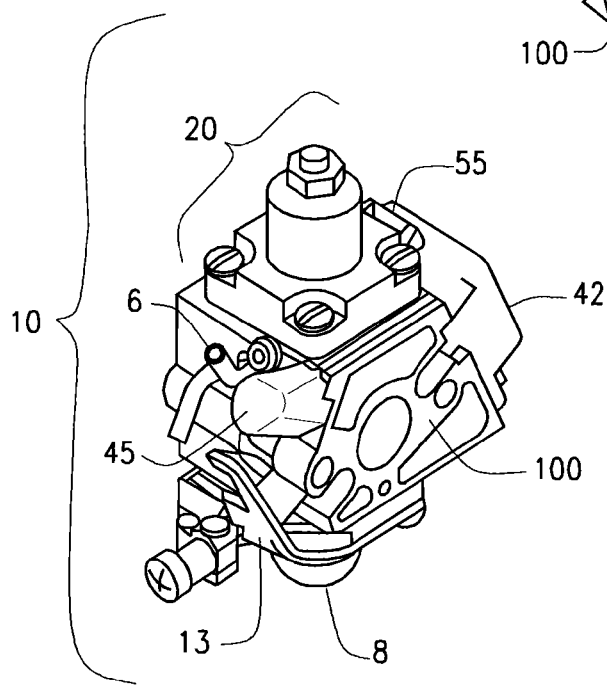
FIG. 5 is a view in perspective showing the fuel pressure regulator assembly for the embodiment shown in FIG. 2.

An electronic control unit (ECU hereinafter) 42 is utilized to control operation of the fuel system 18 shown in FIG. 1a. In general terms, an ignition module 40 is associated with the fly wheel 2 for the purposes described in greater detail below. In any event, the ignition module 40 provides power to the ECU 42 and the ECU 42 preferably controls the operation of the injector 45 and spark timing and consequentially the ignition and the fuel in the chamber 14 based on a number of parameters discussed below. As will be appreciated by those skilled in the art, the general over all engine operation for hand held devices powered by internal combustion engines is well know in the art. The inventive principles of the present disclosure are how this operation is accomplished in minimal space requirements, reliably over the life of the engine 1, and at a cost competitive with present carburetor designs of the prior art. We accomplish this with an integrated approach. Portions of the fuel system 18 described above are integrated within the throttle body 10, as indicated generally by the dashed line 10a of FIG. 1a. Referring now to FIG. 2, the throttle body 10 of the preferred embodiment includes a housing 100 adapted to have a plurality of components attached to it. As indicated, the integration of the throttle body is an important feature of this disclosure, in that it permits substitution of the fuel system 18 described herein for prior art carburetor type systems with little modification of the overall product configuration in which the system described herein finds application. The throttle body housing 100 of the throttle body 10 is preferably constructed of a plastic material; however other materials such as aluminum, for example, may be employed in various embodiments of the disclosure.

The housing 100 of the throttle body 10 has the electronic control unit (ECU) 42, pump assembly 84b, a primer assembly 29, the fuel injector assembly 45, a throttle assembly 13, and the fuel pressure regulator assembly 20 all mounted to it. If desired, these components all can be pre-assembled to the throttle body 10, and the overall assembly then attached to the engine 1. As will be appreciated by those skilled in the art, the throttle body 10 has a number of internally arranged passages formed in it, which together with the various components described herein, are adapted to control fuel flow among the various components and primarily to the combustion chamber 14 for operating the engine 1. The passages include an intake air temperature sensor passage which permits the air temperature sensor 167 mounted to a circuit board 60 of the ECU 42 to ascertain intake air temperature reliably. While a particular design shape is illustrated for the housing 100 of the throttle body 10, other design silhouettes may be used, if desired.

Figure 14:
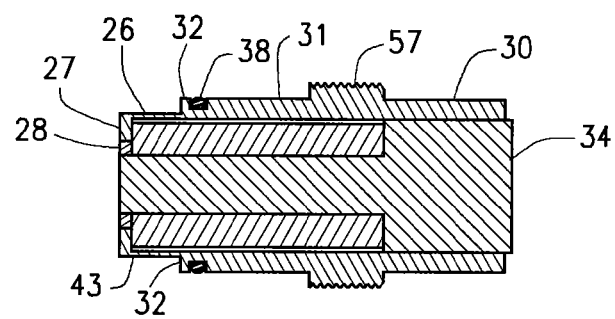
Figure 14A:
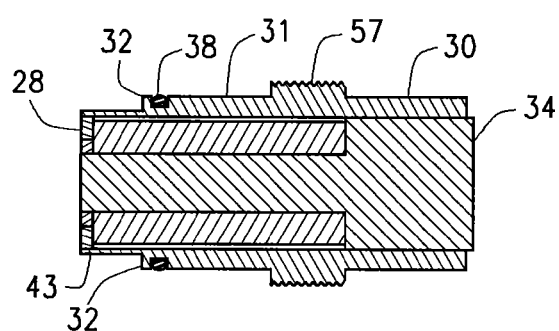
FIG. 14a is a sectional view similar to FIG. 14 showing a second illustrative embodiment of the drive components shown in FIG. 13.

Referring to FIGS. 10-14, the injector assembly 45 is shown in greater detail. As there shown, the injector assembly includes a coil winding 43, which is wound or otherwise positioned on a core 34. The core 34/coil 43 combination is inserted into a motor can 30. The motor can 30 is generally cylindrical in shape, having an axial opening formed in it which is sized to receive the core 34/coil 43 combination in a conventional manner. In the embodiments illustrated in FIGS. 14 and 14a, for example, the relationship between the coil winding 43, the core 34 and the motor can 30 is fixed in position by a suitable epoxy adhesive indicated generally at 28, for example. The difference in the constructions shown in FIGS. 14 and 14a is that the embodiment of FIG. 14 employs a flux ring 27 along an end 26 of the motor can 30. As shown in FIG. 14, the ring 27 is integrally formed with the motor can 30, although a separate ring may be used, if desired. As shown in FIG. 14a, some embodiments of the disclosure may eliminate the use of the ring 27. The motor can 30 also has an external wall 31 defining a shoulder 32 adapted to receive an o-ring 38. The wall 31 also has a plurality of threads 57 formed in it, which permits the motor can 30 to be mounted into an upper body 25 of the injector assembly 45.

The upper body 25 of the injector 45 also is a generally cylindrical shape having a wall 58 defining an axial opening sized to receive the motor can 30 along an internally threaded section 48. The upper body 25 additionally has an externally threaded section 59 which functions to attach a lower body 33 to the upper body 25. In the preferred embodiment, the attachment of the upper body 25 and the lower body 33 is fixed, in addition to the threaded connection 59, by a suitable epoxy adhesive or the like so that the lower and upper bodies are not movable in relationship to one another in the assembled relationship of the injector 45. Other interconnection methods will be apparent to those skilled in the art.

The lower body 33 generally is cylindrical in shape, in the embodiment illustrated, and has a pair of fuel inlets 39, and an integral fuel rail 104 operatively associated with an outlet 105. The fuel rail 104 and associated inlets 39 enable the injector 45 to be installed into an Injector bore 165 of the throttle body 10 (FIG. 2) such that the injector 45 can be mounted in the injector bore 165 in random rotated positions during assembly. This arrangement provides consistent fuel flow to the outlet 105 during operation of the injector 45. Other design shapes for the injector may be employed if desired. A valve pin 46 is positioned to close the outlet 105 or open it depending upon operating conditions imposed on the pin 46. A spring 44 is positioned on the pin 46. The spring 44 is trapped between the lower body 33 and the upper body 25 in a fashion that urges the pin 46 towards a closed position with respect to the outlet 105.

The spring 44 preferably is a flat spring. Those skilled in the art will recognize that other spring types may be employed, if the size of injector 45 is not an overriding consideration. As indicated, the motor can 30 is sized to fit within the upper body 25 and the threads 57/48 are designed for adjusting the travel of the valve pin 46 and spring 44. This is an important feature of the disclosure in that assembly of the injector can be automated in the manufacturing process. For example, the motor can 30 and Pin 46 can be adjusted with respect to one another by means of the internal threaded section 48 to define a first position (closed), and then the motor can 30 may be physically backed off (opened) from the first position to define both a second position and the distance of travel for the pin 46. Consequently, robotic operators, if desired, can easily automate assembly of the injector in production. In the embodiment illustrated, the injector 45 is capable of delivering 5 mm"3 of fuel in less than 4 mS at an engine 1 speed of 12,500 RPM. It also is important to note that the core 34 and coil winding 43 of the injector is in an unimpeded (i.e. direct) coupling relationship with the pin 46, regardless of the embodiment, i.e., FIG. 14 or FIG. 14a, is utilized, which is believed to aid substantially in enabling the injector to achieve the operational characteristics described.

Figure 16:
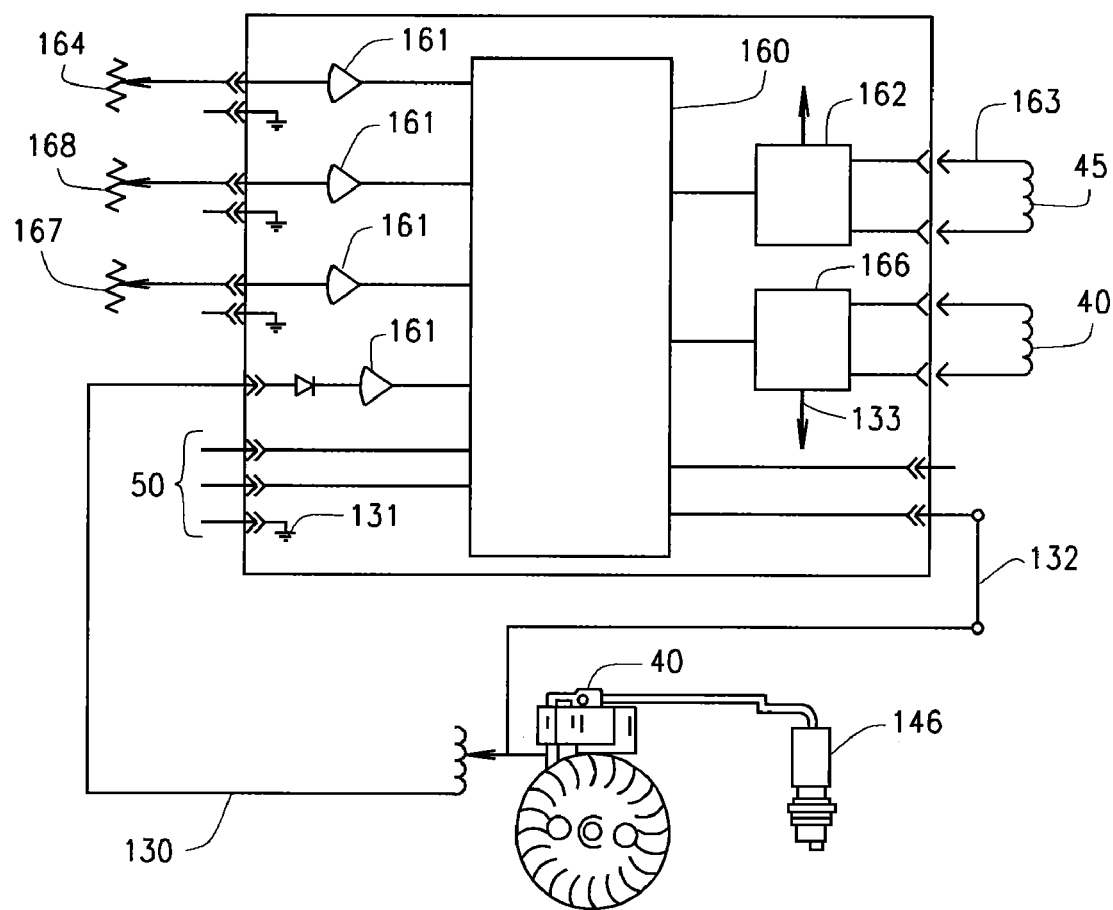
FIG. 16 is a Block diagrammatic view of the Electronic control unit employed with the embodiment of FIG. 1.

The ECU 42 controls operation of the fuel system 18 and consequently of the engine 1. Referring now to FIGS. 2 and 16, it may be observed that component parts of the ECU are mounted on the board 60, which in turn is protected by a cover 23. The ECU itself is mounted to the throttle body 10 by any convenient method. Conventional threaded fasteners 102 work well, for example. Other attachment methods may be employed if desired. The ECU 42 is a low cost integrated solution to control the fuel injection system for 2-cycle engines electronically. The ECU 42 includes an electronic circuit assembly containing a microprocessor 160 having associated with it a non-volatile memory for algorithm and fuel map storage, a plurality of signal conditioning circuits 161, at least one ignition drive circuit 166, an optional communication port 50 and a valve drive circuit 162. Other components of the system include a fuel injection valve control 163, a throttle position sensor 164, and miscellaneous sensors for monitoring engine performance, of which the throttle position sensor 164 and an intake air temperature sensor 167 are mounted on the board 60.

Among the features present in the preferred embodiment are a micro processor based platform for insuring consistent fuel delivery regulation, a solid state fuel delivery system synchronous with ignition, optional field upgradeable firmware and operational software (map). It is also here noted that the cover 23 provides a connection port 55 permitting the electrical interconnection of the ECU 42 and the ignition module 40 as later described in detail.

The fuel supply line 5 is adapted to be connected to a fuel inlet 61 from which fuel passes through the pump assembly 84b. A primer assembly 29 is connected to the outlet of pump 84b where fuel can be drawn into primer bulb 8 of primer assembly 29. The fuel is directed through the pump 84b and into and out of the primer assembly 29 via check valves 85, 85a and 63, identified for the purposes of this specification as the pump inlet check valve 85, the pump outlet check valve 85a and the purger outlet check valve 63. Preferably check valves 85 and 85a are arranged in the same direction so as to only pass fuel to the fuel pressure regulator 81. Additionally the primer assembly 29 has an outlet port and associated check valve 63 which also serves as an inlet check valve for the regulator assembly 20.

In the embodiment illustrated in FIG. 2, the outlet port check valve 63 permits fuel to enter and pass through passages in the throttle housing 100 and a fuel pump cover 67 which in this embodiment has a throttle adjustment screw 86 associated with it. Fuel passing through the check valve 63 also passes through a filter 62 and into the fuel pressure regulator assembly 20 which manages the desired fuel pressure by means of the spring loaded diaphragm 82. As indicated above, the throttle body 10 includes the return line 6 to the tank 4 so that the fuel once pressurized by means of the fuel pump 84b and/or purger assembly 29 and above the desired set point pressure can be relieved and returned to the tank 4 so that constant fuel pressure is maintained.

The fuel pressure regulator 20 also is mounted to the throttle body 10 and includes the diaphragm 82 having the needle 88 mounted to the diaphragm whereby said needle is positioned (normally closed) against an outlet 93 of the fuel pressure regulator 20 by adjustable tension provided to a spring 91 and an adjuster screw 92.

The throttle assembly 13 includes a throttle plate 9, a spring return 153 and a throttle shaft 90 which are mounted in suitable position in the throttle body 10 to provide additional control of airflow to the engine via throttle position. Throttle position may be adjustable by a user, for example. The shaft 90 extents through the throttle body housing 100 and through the ECU board 60 where it transfers rotational angles to throttle position sensor 164 which is mounted to the board 60. The throttle position sensor 164 enables the ECU 42 to determine throttle position directly.

Referring now to FIGS. 6 thru 8, the present disclosure utilizes the ignition module 40 for its operation. In the preferred embodiment illustrated, the ignition module 40 includes an ignition core 120 having a lamination stack 121. Lamination stack 121 is generally a U shape configuration having a first leg 121a and a second leg 121b. The leg 121a has a power generation coil assembly 129 associated with it, while the leg 121b has a transformer assembly 123 mounted to it. The power generation coil assembly 129 has a pair of electrical wires 110 and 111 extending from it to a circuit board assembly 122. The transformer assembly 123 mounted on the leg 121b has four wires 124, 125, 126 and 127 respectively extending from the transformer assembly 123 to the circuit board assembly 122 and a connection 150 for electrically connection the ignition module 40 to a spark plug 146 for the engine 1.

The circuit board assembly 122 has components associated with it for providing information to the ECU 42 for controlling the ignition spark for igniting the fuel in the chamber 14 provided by the injector 45 located in throttle body 10. The output of the circuit board assembly 122 includes a power lead 130, a ground lead 131, a coil trigger lead 132 and a spark advance lead 133, which terminate in a terminal housing 135. The terminal housing 135 is connected to the ECU 42 at port 55.

The ignition module 40 is mounted in operational relationship with the fly wheel 2 of the engine 1. As illustratively shown in FIG. 9, the fly wheel 2 has a plurality of ignition magnets (not shown) associated with it, which magnetically interact with the ignition module 40 to provide power to energize the transformer 123 and power generation coil 129.

The transformer 123 supplies spark energy through spark plug wire connection 150 and supplies the timing reference to the system of the disclosure to control operation of the engine 1. The timing reference is utilized by the ECU 42 for advancing or decreasing the spark angle and fuel injection angle depending upon predetermined conditions. As will be appreciated by those skilled in the art, spark angle refers to the determination of the location of spark trigger based on predetermined conditions for causing ignition of the fuel air mixture in the associated combustion chamber 14. Also as will be appreciated by those skilled in the art, injection angle refers to the determination of the location of injection based on predetermined conditions for causing ignition of the fuel air mixture in the associated combustion chamber 14.

The power generation coil 129 provides power to the ECU 42 by means of terminal connection 135 for both start and run operation. The system is designed to start without the use of a battery by pulling the handle 3 which will generates sufficient power through the power generation coil 129 to initiate the smart choke subroutine described below.

In operation, the ignition module 40 is electrically connected to the ECU 42. As indicated above, the fly wheel 2 associated with the engine 1 has one or more ignition magnets mounted to it. As the fly wheel rotates, each time a magnet passes the first leg 121a and the second leg 122b, the ignition module 40 provides an electrical indication of that fact to the ECU 42. Based on the information provided, the ECU 42 determines the crank angle position of the engine 1 in a simplified manner without complex crank angle position sensors utilized in the prior art.

The operation of the system is designed to be essentially owner proof. That is to say, the system will take whatever mismanagement of the fuel system that an owner might impose on it and still operate properly. The use of an ECU 42 and ignition module 40 with an engine such as that described above requires some delay before the ECU 42 is fully operational. To overcome this problem, the system of this disclosure uses a two-stage power start up, referred to herein as the smart choke and the run algorithms. Normally, the engine 1 is designed to start with one or two pulls of the handle 3. Because the fuel system is pressurized prior to pulling the handle 3, producing spark from the ignition module 40 permits the engine 1 to fire even though the ECU is not fully operational. At start up when the handle 3 is pulled, power is generated by the power generation circuit of the ignition module 40 which energizes the ECU 42. The ECU 42 at that time reads all available sensors and determines from a preset lookup table what fuel requirements are suitable for the starting environment. That fuel requirement is applied to the injector. This process is accomplished while the ECU continues to full power up and switches to the run algorithm.

Figure 15:
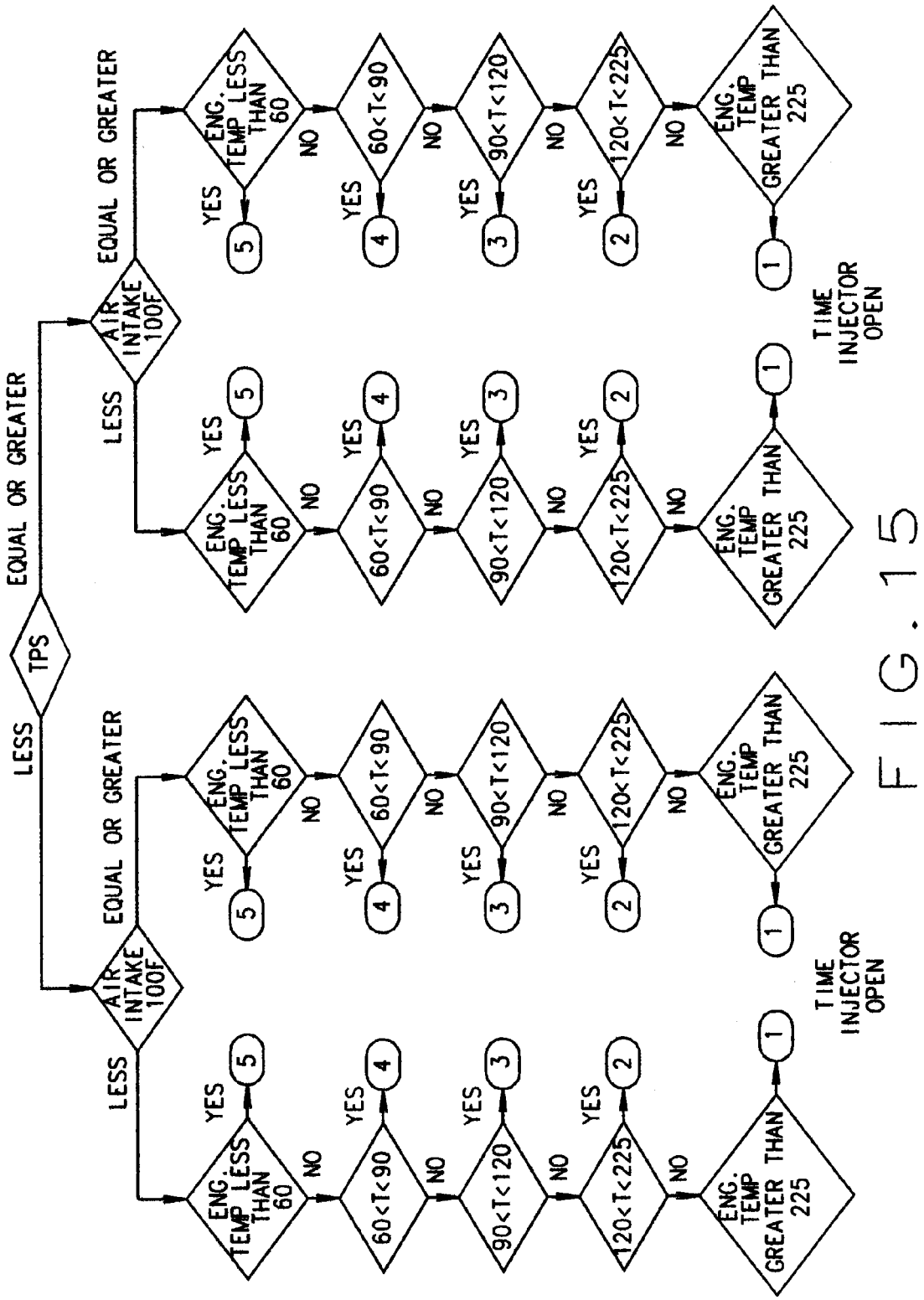
FIG. 15 is a flow chart showing operational parameters of the smart choke operation for the hand-held device shown in FIG. 1 in which the present disclosure finds application.

The smart choke algorithm for operating the ECU 42 and ignition module 40 in this manner is shown in FIG. 15. In the preferred embodiment shown, the ECU 42 receives a number of sensor inputs, depending on the amount of control required or desired for the engine 1. As shown in FIG. 16, the illustrative embodiment utilizes the throttle position sensor 164, the intake air temperature sensor 167 and an engine temperature sensor 168 to control the amount of fuel delivered to the engine 1. Again, as will be appreciated by those skilled in the art, fewer or additional sensors may be employed, if desired. As FIG. 15 illustrates, as temperature increase, the time the injector is opened is decreased.

The smart choke flow chart shown in FIG. 15 is called up only on power up of the engine 1, and expires upon the completion of the system power up and initialization. However, this time sequence is sufficient for the ECU 42 to become operational, and once operational, the ECU takes control of engine 1 operation.

Figure 19:
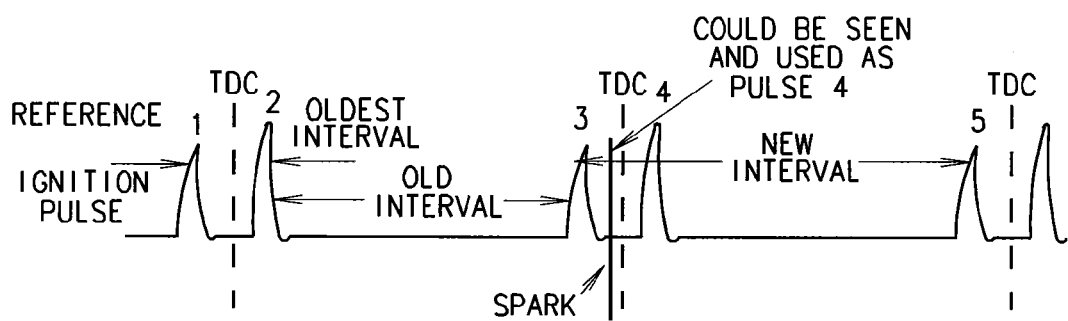
FIG. 19 is a diagrammatic view illustrating the determination of cycle recognition detection and determination of top dead center of the present disclosure.

More specifically after start up, the ECU receives two ignition pulses per rotation of the fly wheel 2, as illustratively show in FIG. 19. The pulses correlate with the flywheel magnets passing the respective legs 121a and 121b of the ignition module 40. By using the first pulse of the rotation cycle, the ECU 42 can easily determine top dead center for the cylinder. The cycle recognition routine set out in FIG. 20 ensures that the ECU selects the first pulse which provides an accurate TDC reference. The operation automatically rejects any false pulse triggers, for example, interference caused by the spark plug firing and thereby preserves the accuracy of the reference. The operation relies on the fact that the magnets on the flywheel conventionally are located approximately forty (40) degrees apart, which corresponds to the minimum timing interval between the ignition pulses (pluses 1 and 2 in FIG. 19). The longer timing interval thereby equates to approximately three hundred twenty (320) degrees (distance between pulse 2 and 3 in FIG. 19). If there were no intervening pulses, i.e., like a spark plug firing, the ECU 42 could just detect the pulse following the longer time interval. One method to eliminate the problem of false pulses is to add noise filters to filter out the false readings. Some embodiments of the disclosure may incorporate the additional hardware used for this purpose.

In the preferred embodiment, however, the ECU 42 is configured to determine the proper pulse without utilizing additional hardware. As illustratively shown in FIG. 20, the ECU 42 keeps track of the previous two intervals and determines the longer of the two intervals (pulses 1, 2 and pulses 2, 3) and divides the longer interval by two. The division by two was chosen to accommodate acceleration of the engine 1 and insures that the next proper interval between pulses must exceed the previous reference interval. Other denominators may be employed, if desired. In any event, the next proper interval then is divided by 2 and becomes the "new" reference interval. Consequently, regardless of whether extraneous noise is present, the method guarantees that if the subsequent interval between pulses exceeds the previously determined threshold, the proper reference pulse had been detected.

Figure 17:
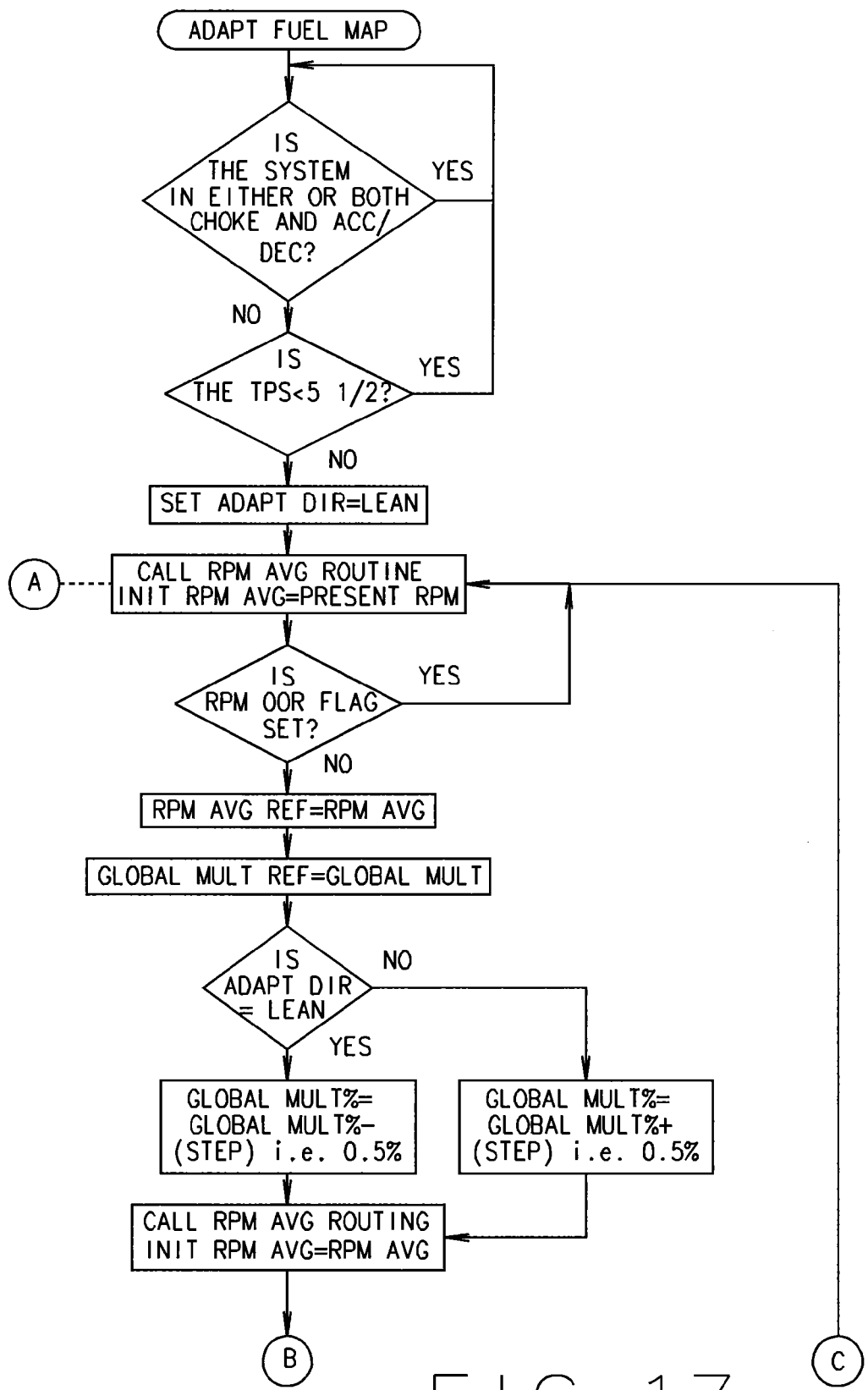
FIG. 17 is a flow chart of an adaptive algorithm illustrating for controlling engine operation.
Figure 17A:
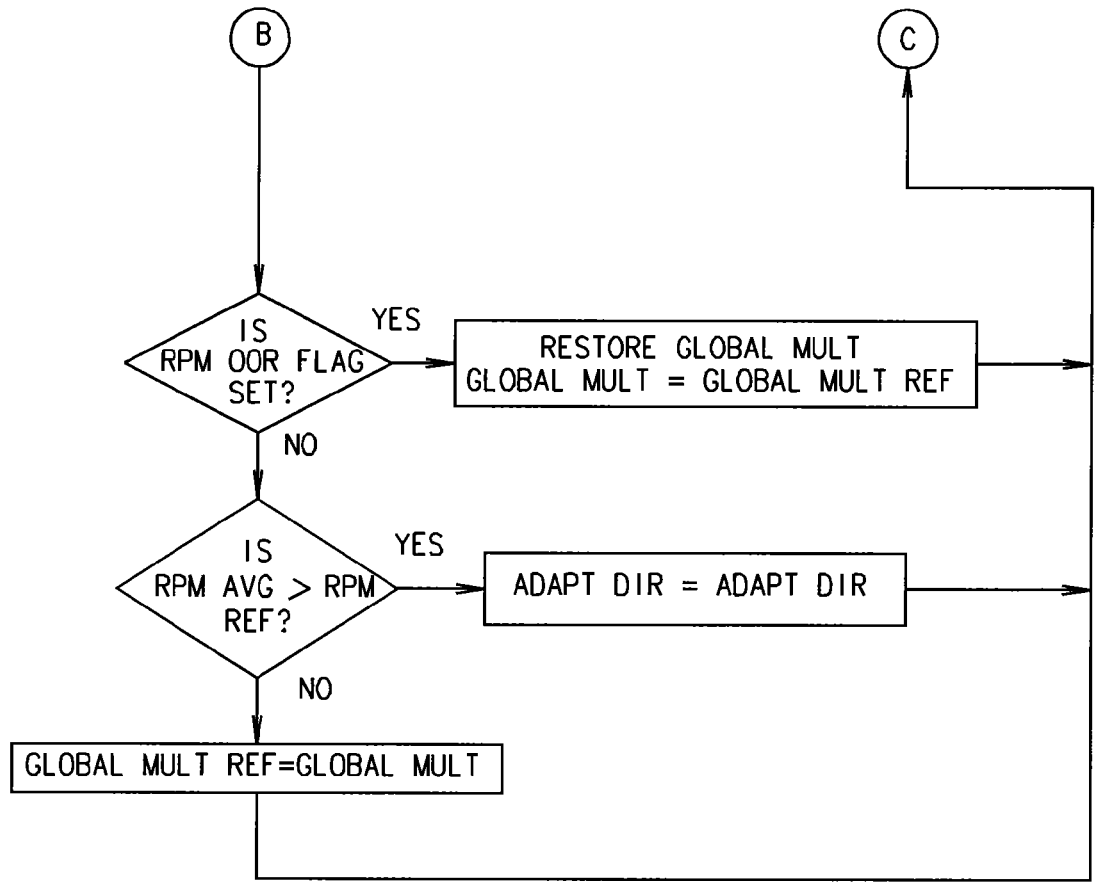
Figure 18:
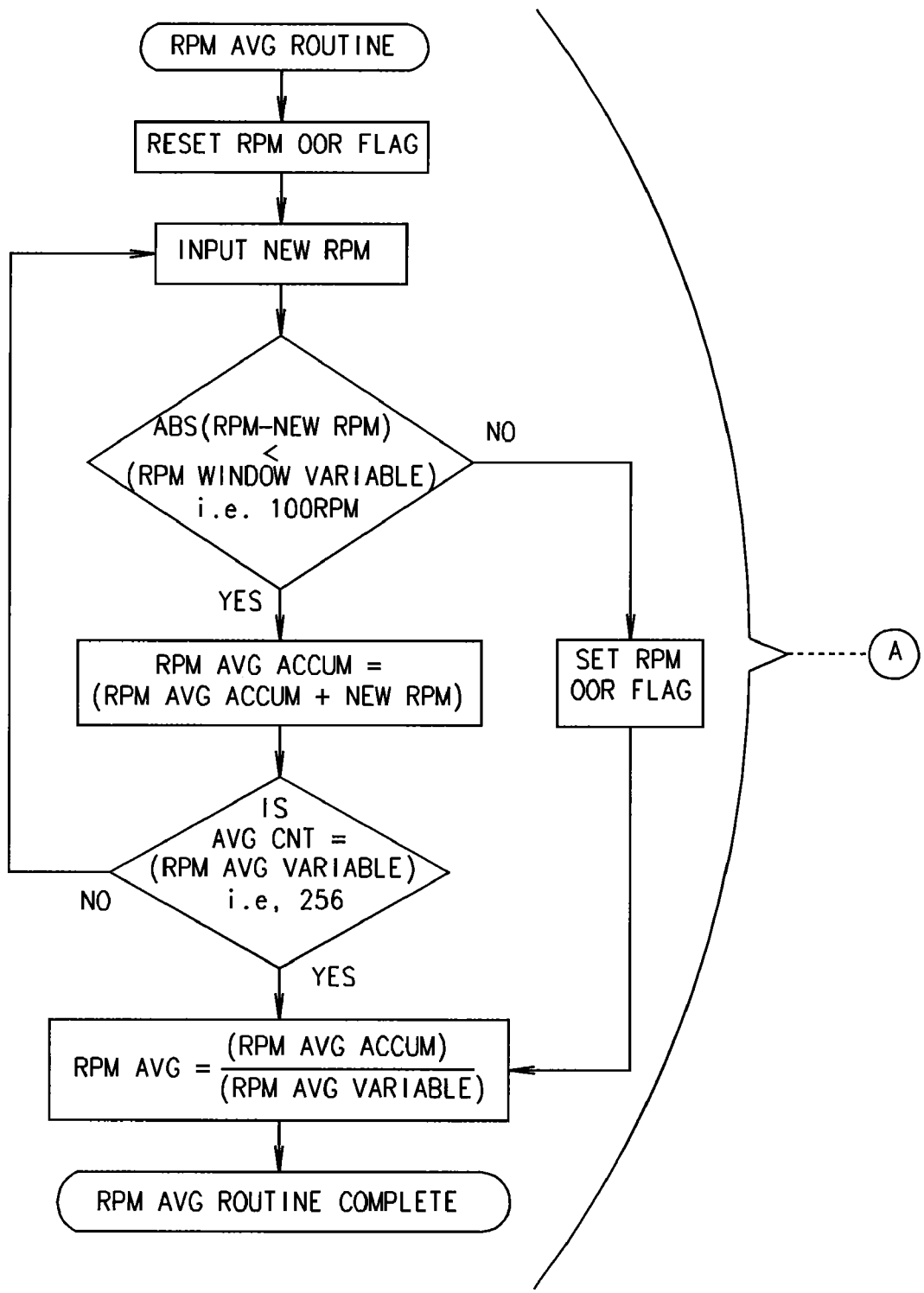
FIG. 18 is a flow chart of a subroutine utilized in conjunction with FIG. 17.
Figure 19A:
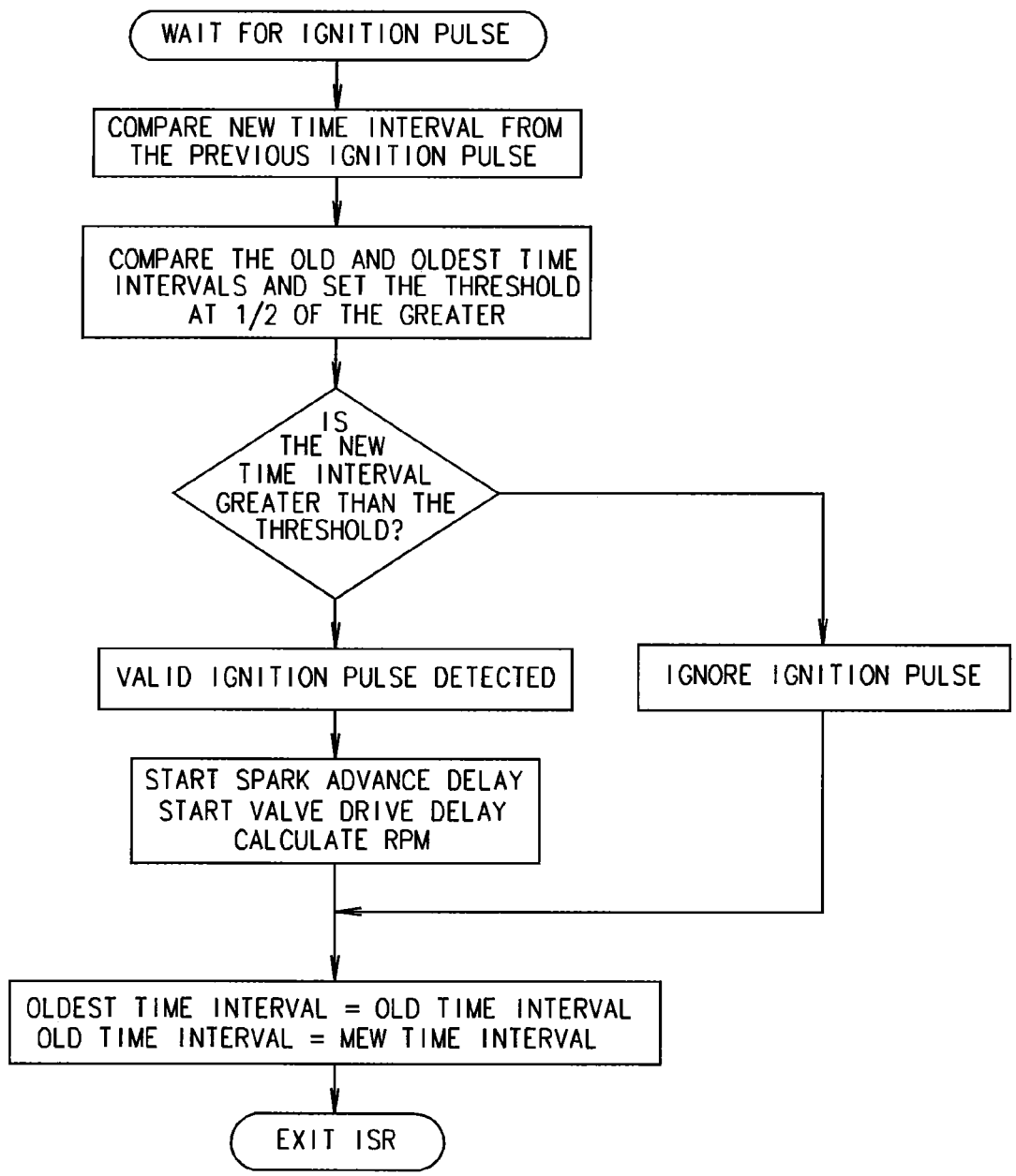
FIG. 19a is a flow chart for implementing the procedure of FIG. 19.

The ECU 42 also operates in a manner to insure the engine 1 always operates at its best performance level regardless of operating conditions. This is accomplished through an adaptive algorithm. The algorithm is broken down into two routines, idle and run. The idle routine is similar to the original method disclosed in the '596 pate patent incorporated herein by reference, but is utilized in the present disclosure to maintain an rpm value instead of an exhaust gas temperature. This is done by determining the engine's desired idle RPM and then hunting to achieve the idle RPM. In this manner the engine can make up for more manufacturing variables and still provide a constant idle speed. The run flow chart shown in FIG. 17, which utilizes the subroutine shown in FIG. 18 to adjust fuel flow to achieve best engine performance is known in the art as lean best power. This occurs when the system maximizes the RPM by continuously hunting for the highest RPM for all operating conditions for the engine 1. The system of the present disclosure differs from the operation disclosed in the '596 patent in that the need for exhaust gas temperature measurement was replaced with rpm measurement to lower the number of sensors required. In addition, hunting for maximum exhaust gas temperature does not provide maximum engine power, whereas hunting for highest RPM produces the maximum engine power for the least amount of fuel consumed, which as indicated above constitutes the operating condition known in the art as lean best power. The basic operation of the idle hunting begins with the determination of an rpm set point. This is typically the designed idle rpm; in this case, is chosen as 3,000 rpm. Once the engine is running and out of choke mode, the idle hunting routine is activated. This routine reads the rpm and determines if it is higher or lower than the preset rpm. If for example it is higher, the unit will increase the fuel through the injector to slow the engine down. In this manner as the engine wears, the ECU can adapt for such wear. The run routine is designed to maximize engine RPM, this occurs like the idle, but only when the engine is not idling. The engine begins a hunt step based on determining an average RPM and comparing it with the previous average rpm. Using this method enables the ECU 42 to determine more accurately what the effects of the last adjustment made had on the operation of the engine. For example, the engine will always begin hunting by decrementing fuel. The next operation taken will be determined from determining whether the engine RPM increased or decreased. If the engine decreased for example, then the system will do the opposite or increase fuel in this example.

Figure 20:
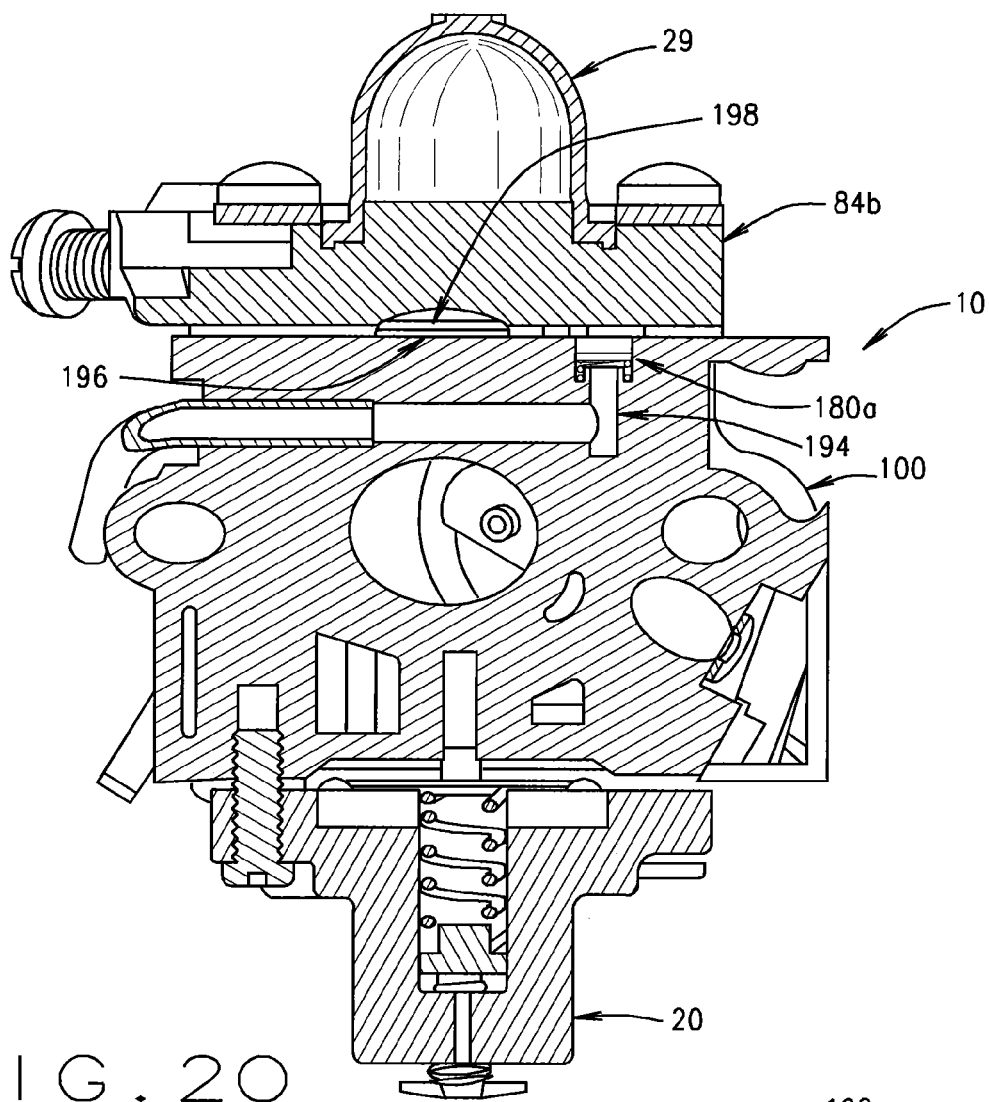
FIG. 20 is a cross-sectional view of the throttle body.
Figure 23:
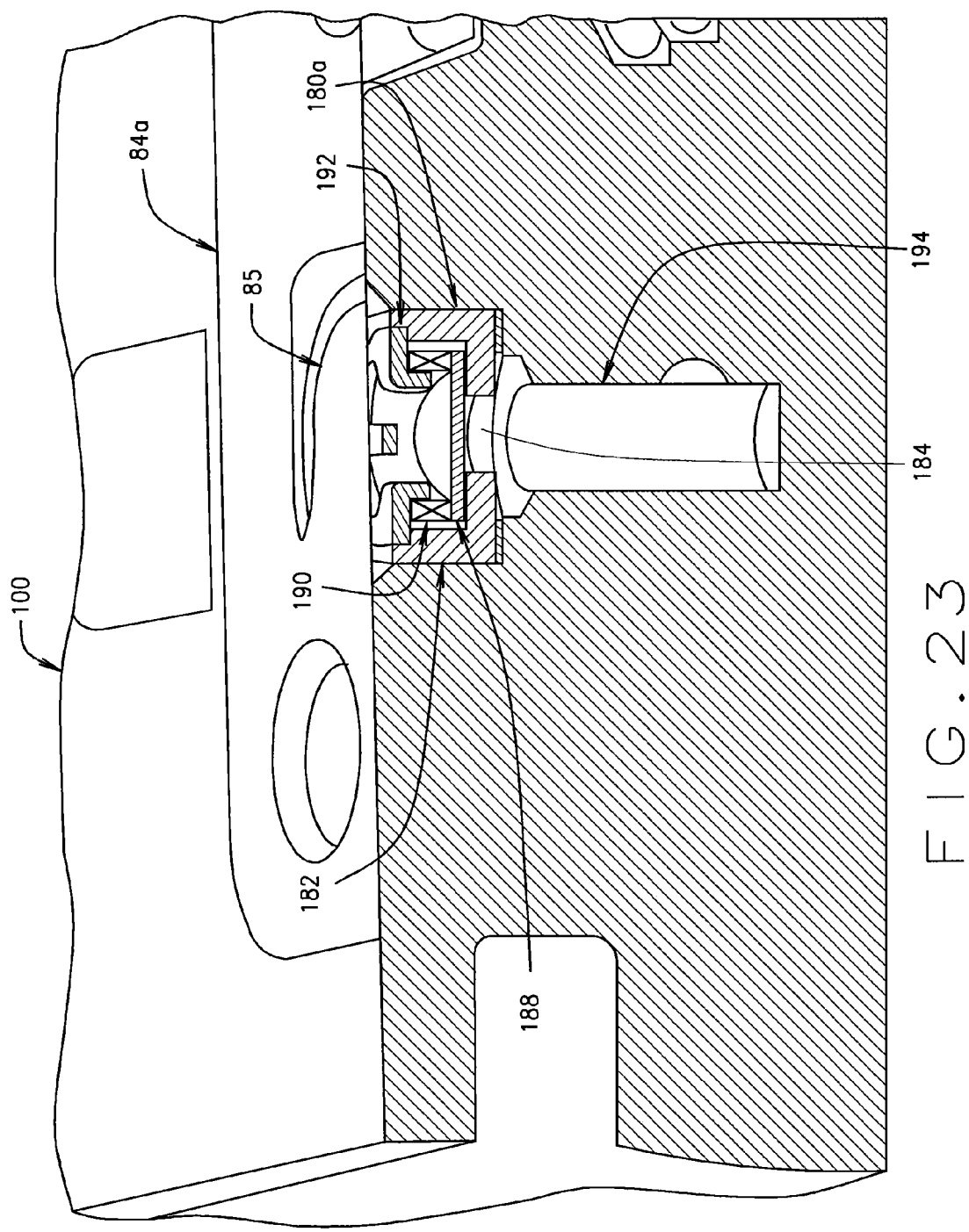
FIG. 23 is a cross-sectional perspective view of a portion of the throttle body, showing an inlet check valve.
Figure 24:
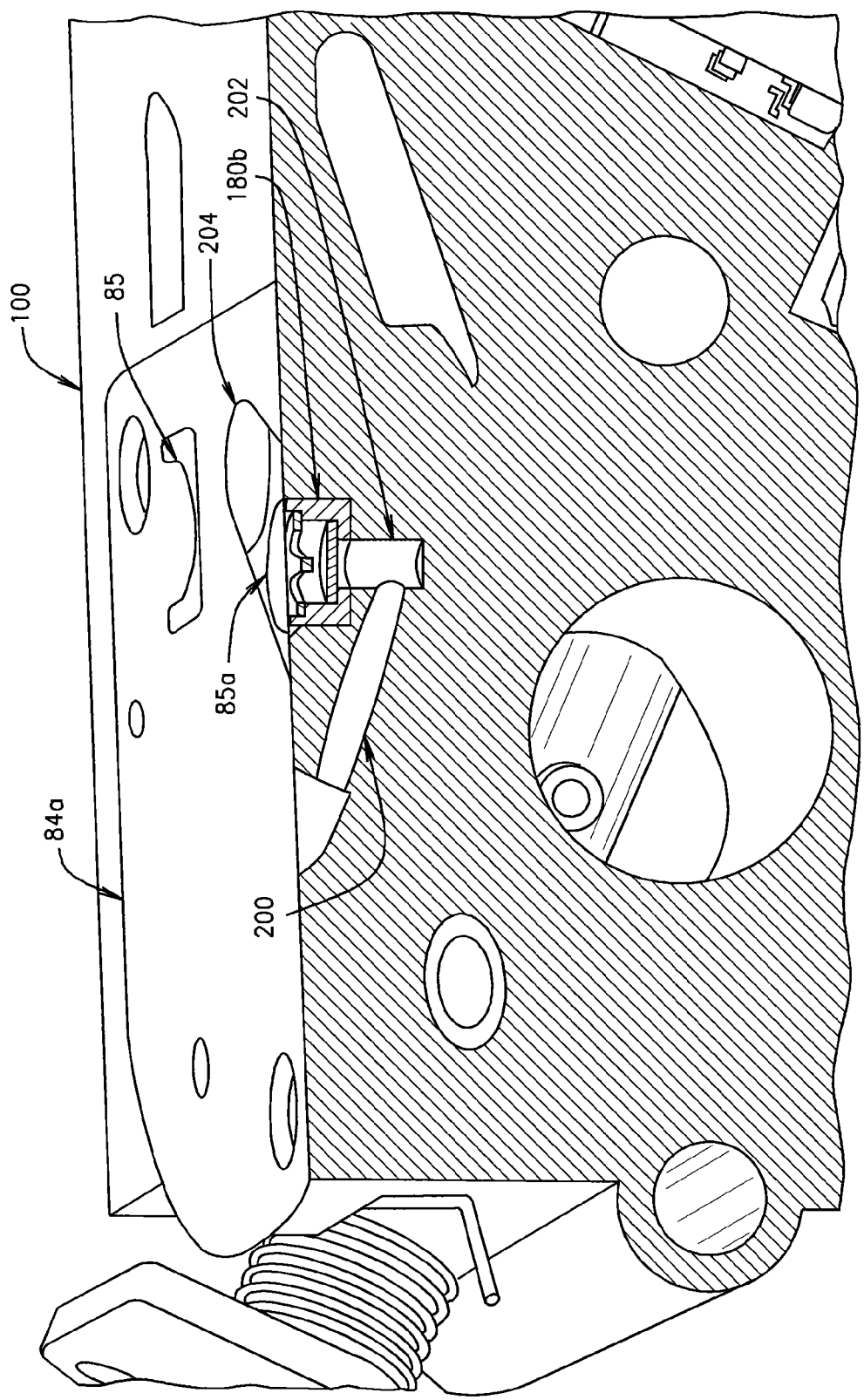
FIG. 24 is a cross-sectional perspective view of a portion of the throttle body, showing an outlet check valve.
Figure 25:
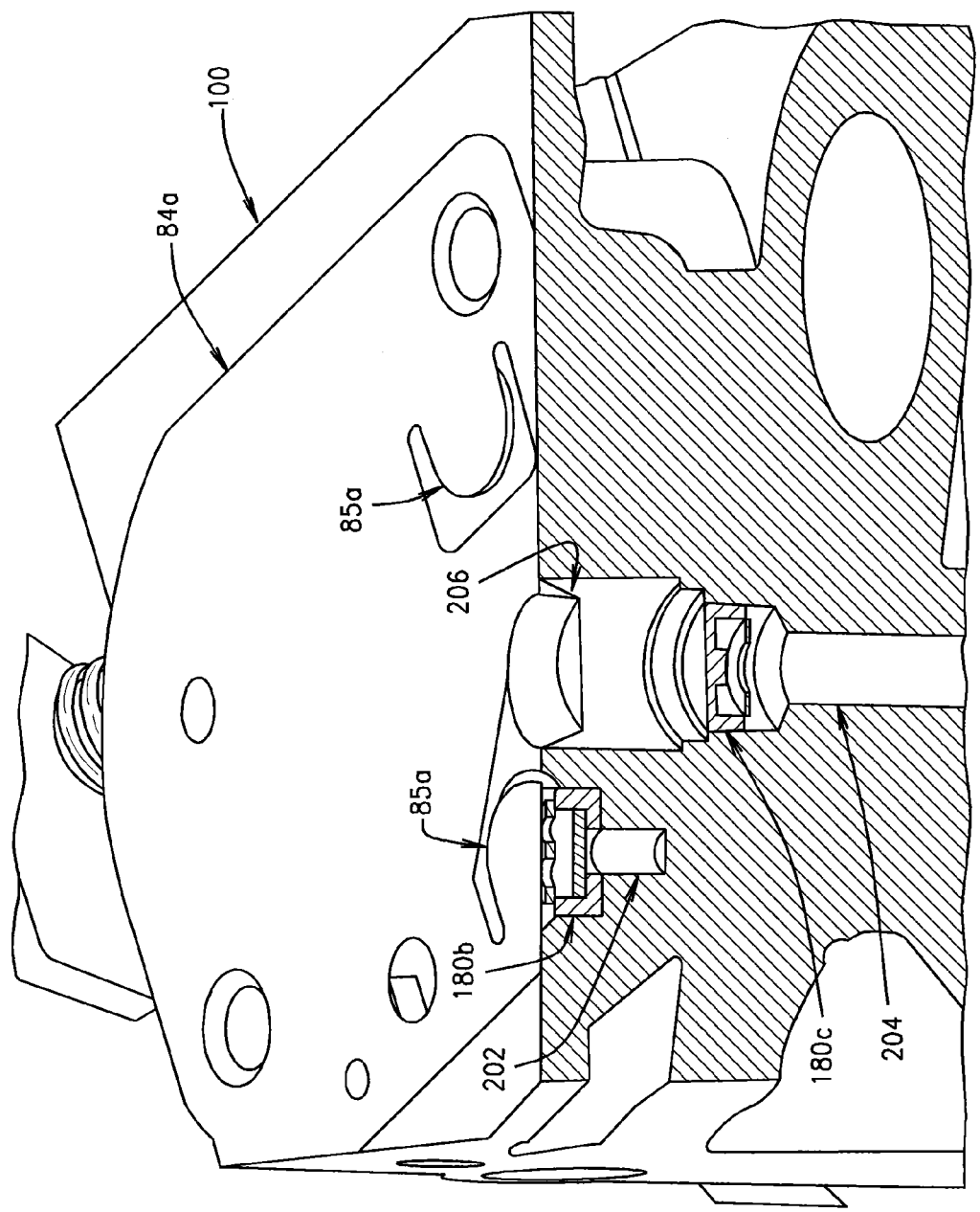
FIG. 25 is a cross-sectional perspective view of a portion of the throttle body, showing the outlet check valve and a purge check valve.

Referring to FIGS. 20-25, another improvement that may be made to the fuel circuit 10*a* of the engine 1 is the addition of a check valve to the fuel inlet system for the throttle body 10. As described above and shown in FIGS. 1A and 2, the check valves 85, 85*a* in the pump 84*b* may be flapper valves 85, 85*a*. The fuel inlet system also includes a purge check valve 63, which facilitates fuel flow from the purge pump 8 to the pressure regulator 20. Thus, as shown in FIG. 1A, the purge pump 8 is located between the outlet flapper valve 85*a* in the pump 8 and the purge check valve 63. One problem that may be encountered with flapper check valves 85, 85*a* is that they may leak when used in high pressure conditions. For example, in a fuel system with a fuel pressure between 1.0 to 6 psi, and more particularly 1.5 to 3.2 psi, flapper valves 85, 85*a* may not be capable of maintaining a sufficient seal in order to maintain the desired fuel pressure. However, flapper valves 85, 85*a* may provide sufficient sealing at fuel pressures of about 1 psi. The use of Mylar material for the flapper valves 85, 85*a* may also improve the performance of the flapper valves 85, 85*a* but may not provide a sufficient sealing of higher pressures, such as 1.0 to 6 psi or 1.5 to 3.2 psi. At higher pressures, flapper valves 85, 85*a* may experience undesirable flexing and wearing of the flexible flap which contributes to leaking. In addition, flapper valves 85, 85*a* can be sensitive to the surface finish of the sealing surfaces. However, flapper valves 85, 85*a* are advantageous in some situations because they are compact and low cost. In particular, as shown in FIGS. 2, 20 and 25, the flapper valves 85, 85*a* may be made integral with the diaphragm 84*a*, which is a thin flexible member sandwiched between the throttle body housing 100 and the pump plate 84.

Figure 21:
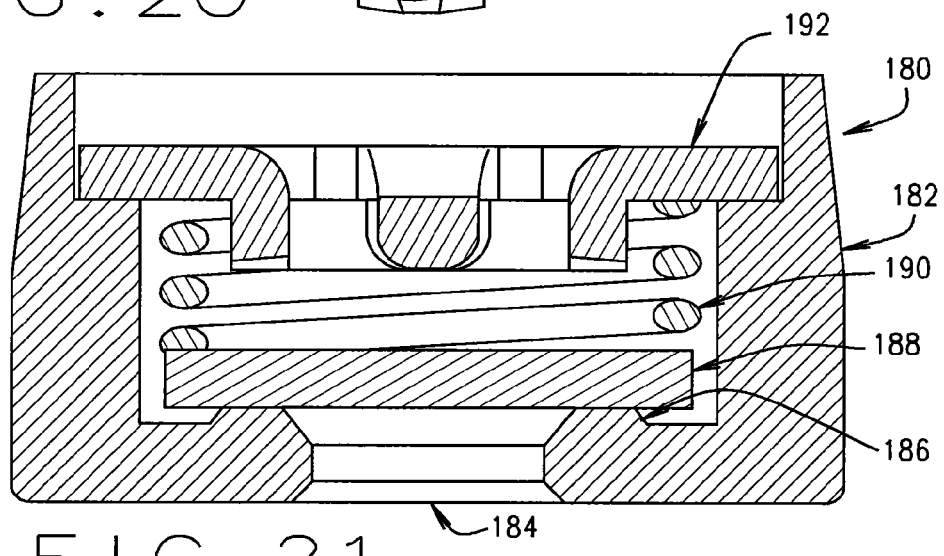
FIG. 21 is a cross-sectional view of a check valve.

In order to provide higher pressures and reduce fuel leakage, a spring-loaded disk check valve 180 as shown in FIG. 21 may be used as a high pressure check valve 180 in the fuel inlet system. Preferably, the high pressure check valve 180 includes a housing 182 with an inlet opening 184 and a sealing ring 186 located within the housing 182 around the inlet opening 184. A disk 188 is positioned within the housing 182 and is adapted to seal against the sealing ring 186. A spring 190 is positioned on the opposite side of the disk 188 to bias the disk 188 against the sealing ring 186. A retainer 192 is fixed at the opposite end of the housing 182 and traps the spring 190 between the retainer 192 and the disk 188. The retainer 192 is open through the center to allow fuel to flow out of the valve 180. Although one embodiment of the high pressure check valve 180 may be a spring-loaded disk check valve, other configurations for the high-pressure check valve 180 are also possible. For example, a disk valve without a spring may also be used. In addition, high pressure check valves 180 may be used in place of the flapper valves 85, 85*a*. Thus, the flapper valves 85, 85*a* may be removed from the system. Alternatively, high pressure check valves 180 may be used in conjunction with the flapper valves 85, 85*a* as described below.

Figure 22:
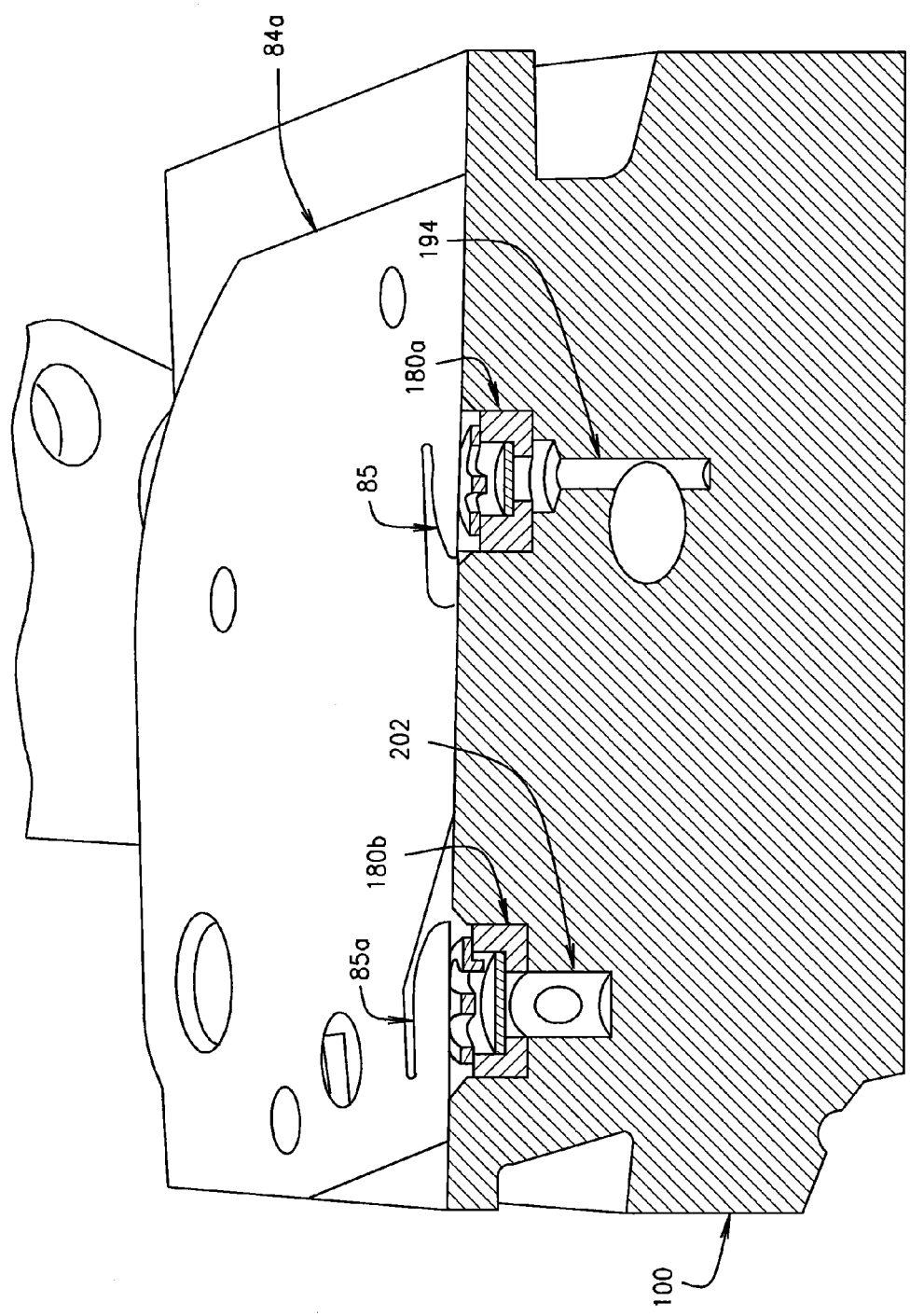
FIG. 22 is a cross-sectional perspective view of a portion of the throttle body.

As shown is FIGS. 20 and 22-23, the inlet spring-loaded disk check valve 180*a* may be located within a passage 194 of the throttle body housing 100 with the inlet opening 184 facing away from the pump diaphragm 84*a*. In particular, in FIG. 23 the inlet spring-loaded disk check valve 180*a* is shown adjacent the inlet flapper check valve 85. Thus, when a vacuum is applied to the first side 196 of the diaphragm 84*a*, fuel is drawn to the second side 198 of the diaphragm 84*a* and is pulled from the inlet passage 194 through the inlet disk check valve 180*a* and the inlet flapper valve 85. An angular passage 200 through the throttle body housing 100 directs the fuel that passes through the inlet disk valve 180*a* and inlet flapper valve 85 to the inlet 202 of the outlet valves 180*b*, 85*a*. The outlet valves 180*b*, 85*a* operate similarly to the inlet valves 180*a*, 85. In particular, the outlet spring-loaded disk check valve 180*b* may be located within a passage 202 of the throttle body housing 100 with the inlet opening 184 facing away from the pump diaphragm 84*a*. As shown in FIGS. 22 and 24-25, the outlet spring-loaded disk check valve 180*b* may be adjacent the outlet flapper valve 85*a*. Thus, when a positive pressure is applied to the first side 196 of the diaphragm 84*a*, fuel is expelled from the second side 198 of the diaphragm 84*a* and is pushed through the outlet disk check valve 180*b* and the outlet flapper valve 85*a*.

As shown in FIGS. 24-25, the fuel is directed from the outlet disk valve 180*b* and outlet flapper valve 85*a* to the pump outlet passage 204 in the throttle body housing 100. A filter 206 may be provided in the pump outlet passage 204. In addition, another spring-loaded disk check valve 180*c* may be provided in the pump outlet passage 204. The spring-loaded disk check valve 180*c* in the outlet passage 204 serves as the purge check valve 180*c* and may have the same construction as the inlet and outlet disk valves 180*a*, 180*b* described above. However, unlike the inlet and outlet disk valves 180*a*, 180*b*, the purge disk valve 180*c* is installed in the throttle body housing 100 in the reverse orientation with the inlet opening 184 facing toward the diaphragm 84*a*.

One of the advantages of the valve arrangement described above is that the disk valves 180*a*, 180*b*, 180*c* may be mounted within the throttle body housing 100 without increasing the size of the fuel system. In addition, relatively inexpensive disk valves 180*a*, 180*b*, 180*c* may be used to provide higher pressures while minimizing fuel leaks through the valves in the pump 84*b*. The disk valves 180*a*, 180*b* may also be used in conjunction with flapper valves 85, 85*a*. If additional cost savings are desired, the springs 190 in the disk check valves 180*a*, 180*b*, 180*c* may also be eliminated or the flapper valves 85, 85*a* may be eliminated.

Figure 26:
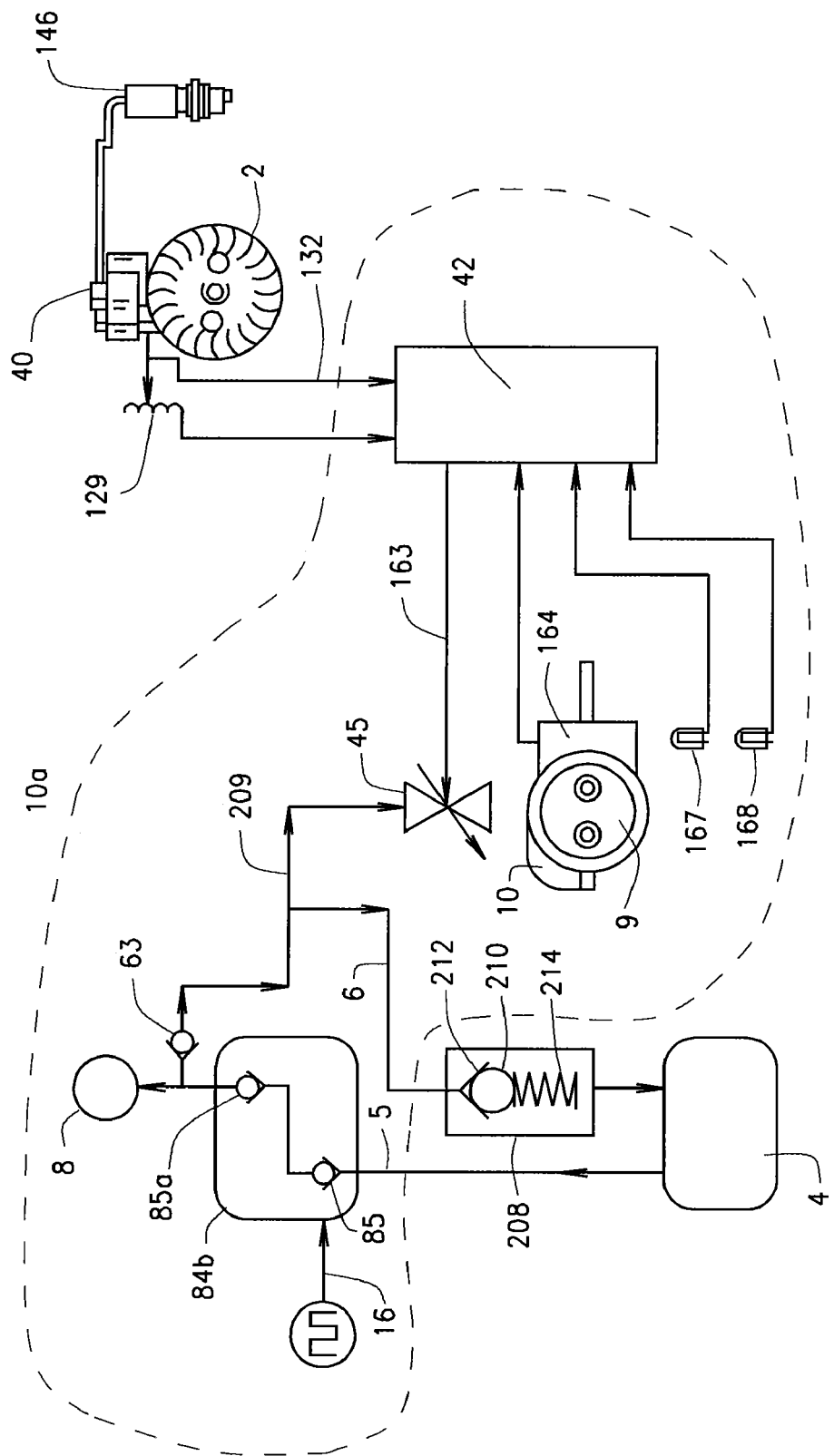
FIG. 26 is a block diagram view of another fuel system with an external pressure regulator.

Referring to FIG. 26, a schematic of the fuel system is shown with an external pressure regulator 208. In contrast to the embodiment of the fuel system shown in FIGS. 1A and 2, the pressure regulator 208 in this embodiment is physically separate from the throttle body 10 and is not incorporated into the throttle body 10. Instead, the pressure regulator 208 may be located within the fuel return line 6. Although various types of pressure regulators may be used, the pressure regulator 208 may include a ball 210 biased against a seat 212 by a spring 214. Thus, at least a portion of the fuel return line 6 will be pressurized at the same fuel pressure supplied to the injector 45. As shown, the pressure regulator 208 releases fuel pressure from a passage 209 in the throttle body housing 100 that provides fuel from the pump 84*b* to the injector 45. One advantage of this alternative is that the throttle body 10 may be made smaller and less complicated. Another advantage is that a less expensive pressure regulator 208 may be used, and the pressure regulator 208 need not be specially designed to be attached to the throttle body 10.

Figure 27:
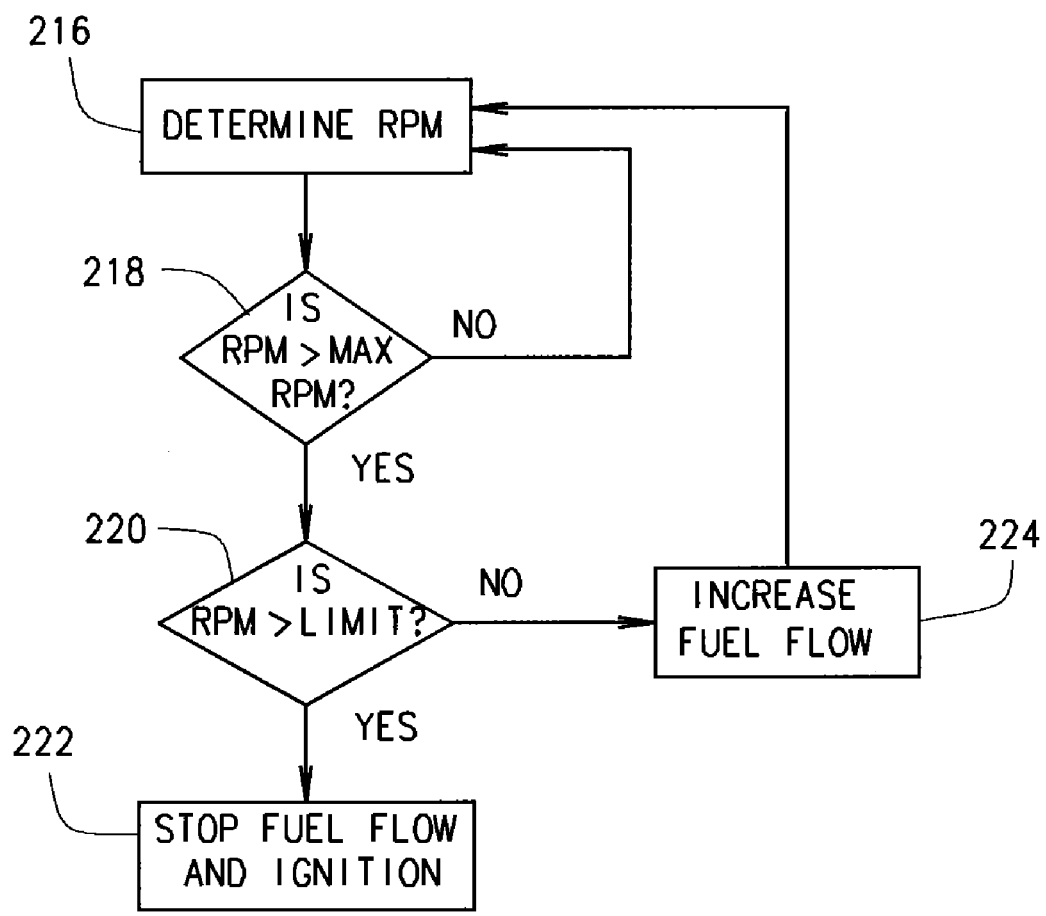
FIG. 27 is a flow chart of an algorithm for limiting the maximum speed of the engine.

Referring to FIG. 27, a flow chart of an algorithm is shown for limiting the maximum speed of the engine 1. In general, the maximum speed of the engine 1 may be set to provide a safety limit for the operator of the engine 1. For example, if the engine 1 is being used to power a hand-held power tool, such as a hedge trimmer or brush cutter, a maximum engine speed may be desired to limit the speed of the tool because of safety concerns. In addition, a maximum engine speed may be desirable to prevent damage to the engine 1 or the power tool due to excessive speed. Thus, a maximum engine speed may improve the durability of the engine 1 and the power tool. One method that may be used to limit maximum engine speed is to reduce the fuel flow to the engine 1 below the optimum fuel flow. However, one disadvantage of this method is that the power tool may experience noticeable power loss near the maximum engine speed when the power tool is being used under load. Another method of limiting maximum engine speed is to retard the ignition timing or to skip ignition cycles. However, this method can be difficult to control and may result in undesirable power losses.

As shown in FIG. 27, the RPM of the engine 1 is determined by the ECU 42 (216). The RPM may be determined as the speed of a single revolution of the engine 1 or may be calculated as an average RPM for a number of engine revolutions as demonstrated in FIGS. 17-18. The RPM is then tested to decide whether the RPM is greater than a maximum RPM (218). Preferably, the maximum RPM is a preset limit fixed by the manufacturer. Typically, for a two-cycle engine used with a hand-held power tool, a maximum RPM may be between about 9,000 RPM and 12,000 RPM. In the present example, the maximum RPM may be set to be 10,000 RPM. If the RPM of the engine 1 is less than the maximum RPM, no change is made to the fuel flow as a part of the algorithm in FIG. 27. The method is then continuously repeated by determining the RPM of individual engine revolutions or average RPM values (216).

If the RPM is greater than the maximum RPM, the RPM is tested again to decide whether the RPM is greater than an upper limit (220). Preferably, the upper limit is a preset limit that is fixed by the manufacturer which is higher than the maximum RPM. For example, in the present example where the maximum RPM may be 10,000 RPM, the upper limit may be 11,000 RPM. As described below, the upper limit may be designed as a failsafe mechanism to ensure that the engine speed cannot increase above the upper limit. If the RPM is less than the upper limit, the fuel flow to the engine is increased (224). The method may then be continuously repeated by determining the change in the RPM after the fuel flow has been increased (216). The speed of the engine 1 may also be tested in steps (218) and (220) by using a fuel map made up of different cells assigned to engine speed ranges. Thus, the fuel flow may also be increased in step (224) by assigning a higher fuel flow rate to the fuel map cell assigned to the speed range between the maximum RPM and the upper limit. As a result, the fuel flow to the engine 1 will run rich when the RPM is above the maximum RPM. The increase in fuel flow may be made in relatively small increments or may be made as a single larger adjustment in the fuel flow. In addition, the changes in the fuel flow may be fixed increments in the volume of fuel flow, or the changes may vary depending on the value of the RPM or other factors. Preferably, the fuel flow is increased by increasing the amount of time that the injector 45 is open during each cycle.

If the RPM is greater than the upper limit, other methods are used to slow the speed of the engine (222). For example, the fuel flow to the engine 1 may be shut off and the ignition may be stopped. There are several reasons why the engine 1 may tend to exceed the upper engine speed limit. For example, if the engine 1 is running lean when the fuel flow is increased, the engine speed may increase in response to the fuel flow change. If the maximum RPM and the upper limit are set relatively close to each other, the increase in engine speed may cause the RPM to jump over the upper limit. In another example, if the engine 1 is running rich near the maximum RPM, a sudden reduction in fuel flow could cause the engine 1 to run closer to the optimum air-fuel ratio which may result in the engine running faster. This could occur when the fuel tank 4 runs out of fuel. In yet another example, the engine 1 may become so hot that the fuel starts to ignite spontaneously in the combustion chamber. This is sometimes referred to as auto-ignition. By providing another adjustment to slow the engine speed in addition to increasing the fuel flow above the maximum engine speed, the engine 1 may be provided with a failsafe mechanism to ensure that the engine speed does not cross the upper limit.

The algorithm shown in FIG. 27 provides several advantages. In particular, the maximum speed of the engine 1 may be controlled by increasing fuel flow to the engine 1 instead of cutting fuel flow. This allows the engine 1 to provide more reliable power to a power tool when the engine 1 is operating at or near the maximum RPM. Changes to the fuel flow may also be used with changes to the ignition timing if desired. Alternatively, the algorithm may be used to control the maximum RPM without any changes to the ignition timing. An extra step may also be included to ensure that the engine speed does not increase above an upper limit as described above. A second mode of slowing the engine 1 may be used to prevent the RPM from exceeding the upper limit, such as stopping the fuel flow and/or the ignition. The algorithm may also be used separately as a method for limiting the maximum RPM or may be included as part of the algorithms described above for optimizing engine performance.

Figure 28:
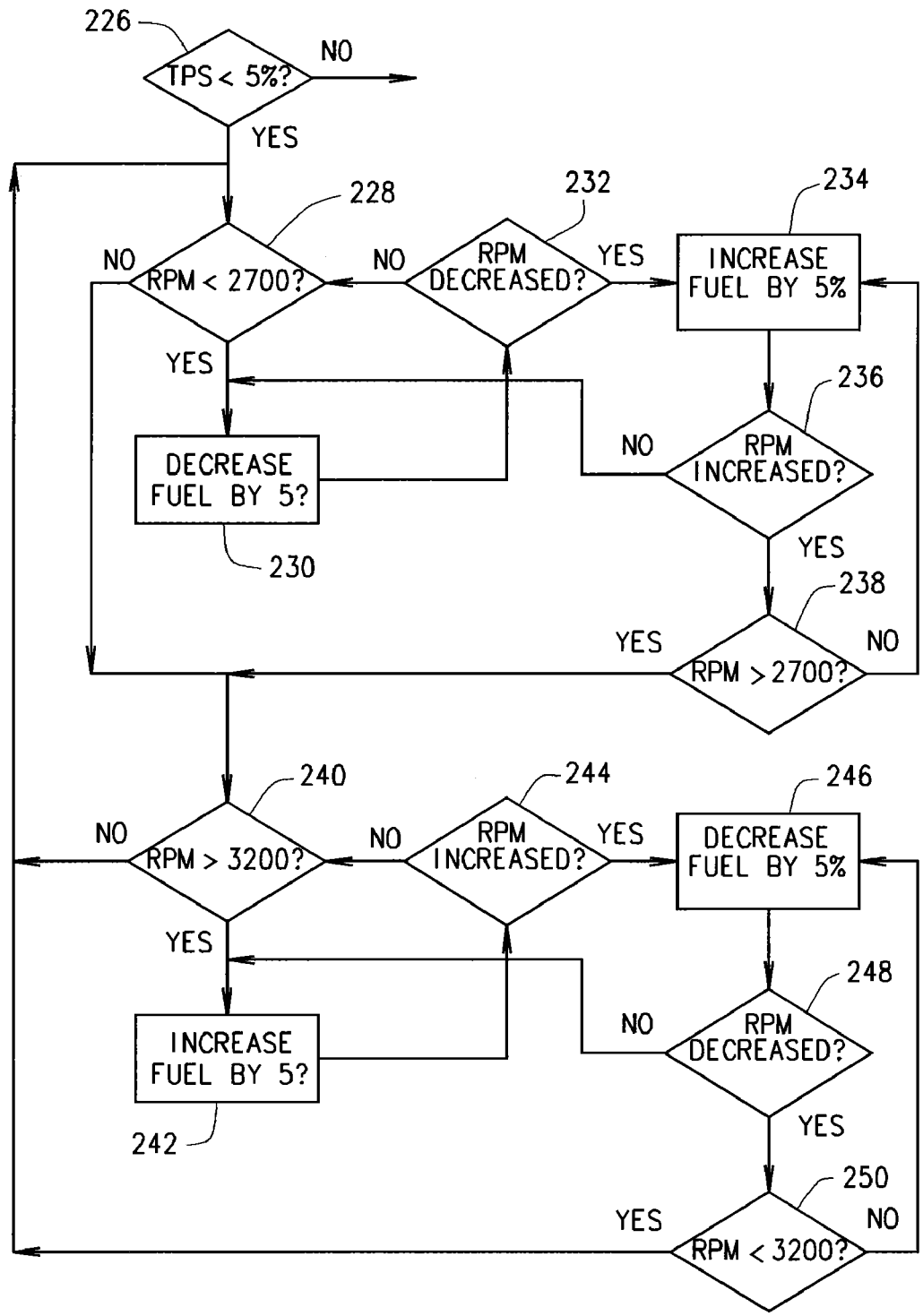
FIG. 28 is a flow chart of an algorithm for maintaining the idle speed of the engine.

Referring to FIG. 28, a flow chart of an algorithm is shown for maintaining the engine within a predetermined idle speed range. The algorithm is typically initiated when the throttle position sensor is less than 5% open (226). If the throttle position sensor is more than 5% open, the adaptive algorithm described above may be used to maximize engine speed (shown in FIGS. 17-18). However, the transition between the idle speed algorithm and the operating speed algorithm may be another throttle position other than the 5% open position. For example, in some systems the transition to idle may occur at a higher throttle position instead, such as a 10% open throttle position. The idle algorithm is designed to maintain the engine speed within a predetermined range by adjusting the fuel flow to the engine. For example, the predetermined idle speed range may have a lower speed boundary of 2,700 rpm and an upper speed boundary of 3,200 rpm. Although fuel flow may be adjusted in several ways, it is preferred that the injector 45 is adjusted by the ECU 42 to change the amount of time the injector 45 is open during each cycle.

The idle algorithm first tests whether the engine speed is less than the lower speed boundary, which in this example is 2,700 rpm (228). If the engine speed is less than 2,700 rpm, the fuel flow is decreased (230). For example, if a predetermined fixed reduction is desired, the fuel flow may be reduced by 5%. However, other proportions for fuel reductions and increases may be used in the steps described herein. The algorithm then tests whether the engine speed decreased (232). Changes in the engine speed may be compared in this step and other similar steps by comparing the speed of individual engine revolutions or by averaging groups of engine speeds and comparing the before and after averages. If the engine speed increases, this generally means that the fuel flow to the engine was rich before the decrease in fuel flow (232). In this case, the speed of the engine is retested to determine whether the engine speed is still below 2,700 rpm (228).

Alternatively, if the engine speed decreases, this generally means that the fuel flow to the engine was lean before the decrease in fuel flow (232). In this case, the fuel flow is increased by 5% (234). The algorithm may then test whether the engine speed increased in response to the increase in fuel flow (236). If the speed decreases, the algorithm returns to the fuel reduction step previously described (230). However, if the engine speed increases, the engine speed is tested to determine whether the engine speed is greater than 2,700 rpm (238). If it is less than 2,700 rpm, the fuel flow is increased again as previously described (234). If the engine speed is greater than 2,700 rpm, the algorithm moves on to test the upper speed boundary (240).

After the idle algorithm determines that the engine speed is above the lower speed boundary, the algorithm tests whether the engine speed is greater than the upper speed boundary, which in this example is 3,200 rpm (240). If the engine speed is greater than 3,200 rpm, the fuel flow is increased (242). The algorithm then tests whether the engine speed increased (244). If the engine speed decreases, this generally means that the fuel flow to the engine was rich before the increase in fuel flow (244). In this case, the speed of the engine is retested to determine whether the engine speed is still above 3,200 rpm (240).

Alternatively, if the engine speed increases, this generally means that the fuel flow to the engine was lean before the increase in fuel flow (244). In this case, the fuel flow is decreased by 5% (246). The algorithm may then test whether the engine speed decreased in response to the decrease in fuel flow (248). If the speed increases, the algorithm returns to the fuel increase step previously described (242). However, if the engine speed decreases, the engine speed is tested to determine whether the engine speed is less than 3,200 rpm (250). If it is greater than 3,200 rpm, the fuel flow is decreased again as previously described (246). If the engine speed is less than 3,200 rpm, the algorithm returns to test the lower speed boundary (228).

Figure 29:
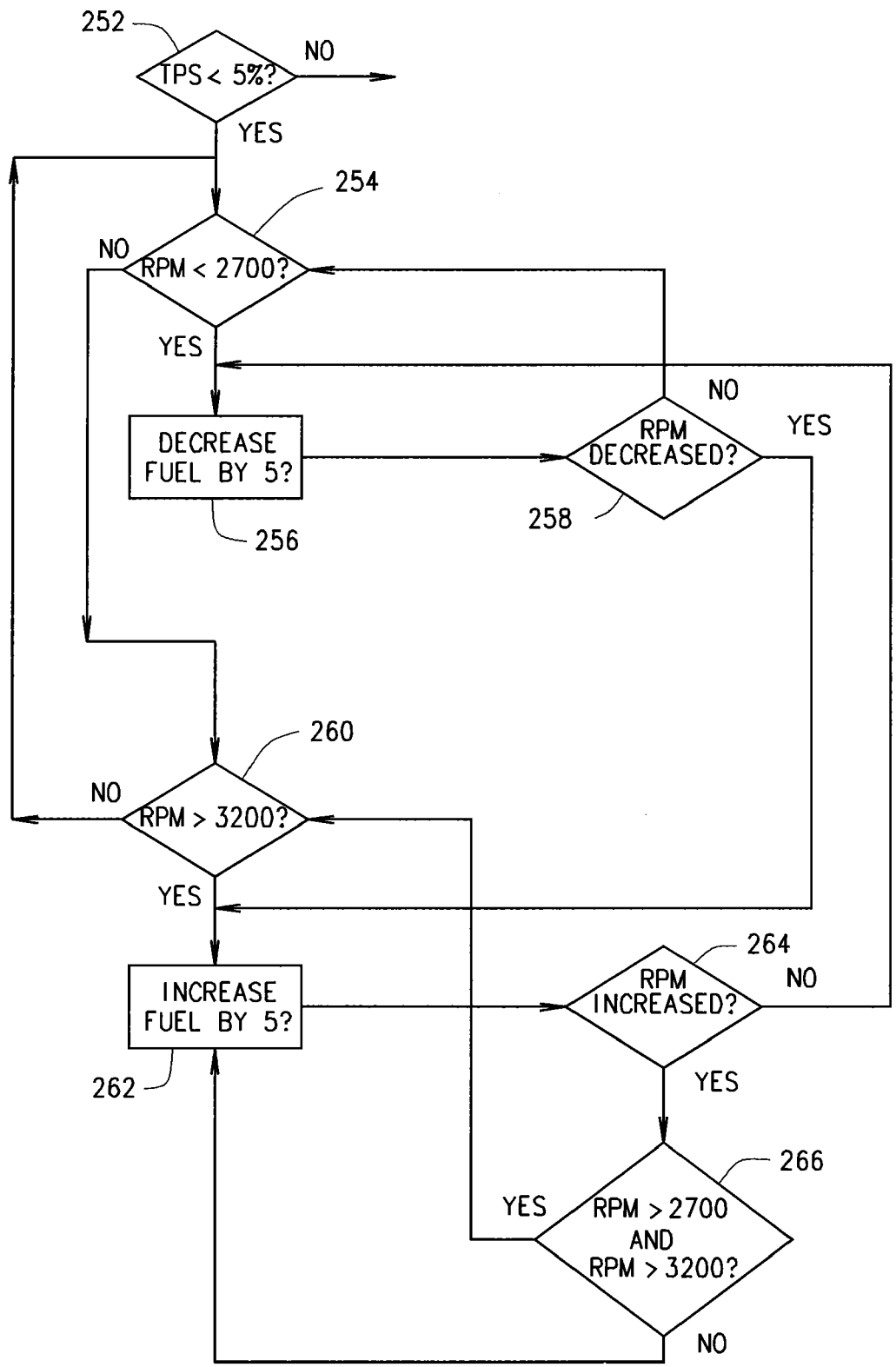
FIG. 29 is a flow chart of another algorithm for maintaining the idle speed of the engine.

A variation of the idle algorithm is shown in FIG. 29. The steps of the idle algorithm shown in FIG. 29 are similar to the algorithm shown in FIG. 28. However, the number of steps in the algorithm have been reduced in FIG. 29 to simplify the algorithm. The algorithm is typically used when the throttle position sensor is less than 5% open (252). The idle algorithm first tests whether the engine speed is less than the lower speed boundary (254). If the engine speed is less than 2,700 rpm, the fuel flow is decreased by 5% (256). The algorithm then tests whether the engine speed decreased (258). If the engine speed increases, this generally means that the fuel flow to the engine was rich before the decrease in fuel flow (258). In this case, the speed of the engine is retested to determine whether the engine speed is still below 2,700 rpm (254). If the engine speed decreases, this generally means that the fuel flow to the engine was lean before the decrease in fuel flow (258). In this case, the fuel flow is increased by 5% (262).

After the idle algorithm determines that the engine speed is above the lower speed boundary, the algorithm tests whether the engine speed is greater than the upper speed boundary (260). If the engine speed is greater than 3,200 rpm, the fuel flow is increased (262). The algorithm then tests whether the engine speed increased (264). If the engine speed decreases, this generally means that the fuel flow to the engine was rich before the increase in fuel flow (264). In this case, the fuel flow is decreased by 5% (256). If the engine speed increases, this generally means that the fuel flow to the engine was lean before the increase in fuel flow (264). In this case, the speed of the engine is tested to determine whether the engine speed is between 2,700 rpm and 3,200 rpm (266). If the engine speed is not within the desired idle speed range, the fuel flow is increased by 5% (262). If the engine speed is within the desired speed range, the algorithm may continue to test the upper and lower speed boundaries (260, 254).

The idle algorithms are especially useful with the described ECU 42 and injector 45 because the idle speed may be automatically adjusted by the ECU 45 to maintain the idle speed within a predetermined range. This may be important because engine performance may change over time due to wear of engine and throttle components. In addition, other operating conditions, such as temperature changes, can affect the idle speed. Thus, the idle algorithms can maintain a generally constant idle speed over a wide range of operating conditions. The idle algorithms also provide improved speed stability at any particular operating condition. Because idle speed uses substantially less fuel flow compared to operating speed, the idle speed can be inherently unstable. Thus, some fuel systems have difficulty in maintaining speed stability at idle. For example, fuel systems that seek optimum operating performance may not work well at idle speed because the engine speed may unexpectedly jump or fall outside of the desired idle speed range. This could be a particular problem for hand-held power tools that use an auto-clutch to operate the tool. In such a case, the tool automatically starts to operate when the engine speed reaches a predetermined level. Thus, an unstable idle speed may inadvertently engage the auto-clutch to cause the power tool to unexpectedly start operating.

Modifications may be made to the algorithms described herein as desired. For example, the algorithms may be interrupted if certain conditions occur. The algorithms may also be combined with other algorithms to test for other performance characteristics. In addition, the algorithms may be simplified by including assumptions about the expected engine behavior in normal operating conditions. For example, the idle algorithms may be based on the assumption that the engine will be initially adjusted at the factory to be approximately 400 rpm rich at idle speed. In other words, the idle speed may be set at the factory by adjusting the fuel flow to obtain the highest idle speed possible (i.e., optimum fuel flow) and then richening the fuel flow by increasing the fuel flow until the idle engine speed decreases by 400 rpm.

Figure 30:
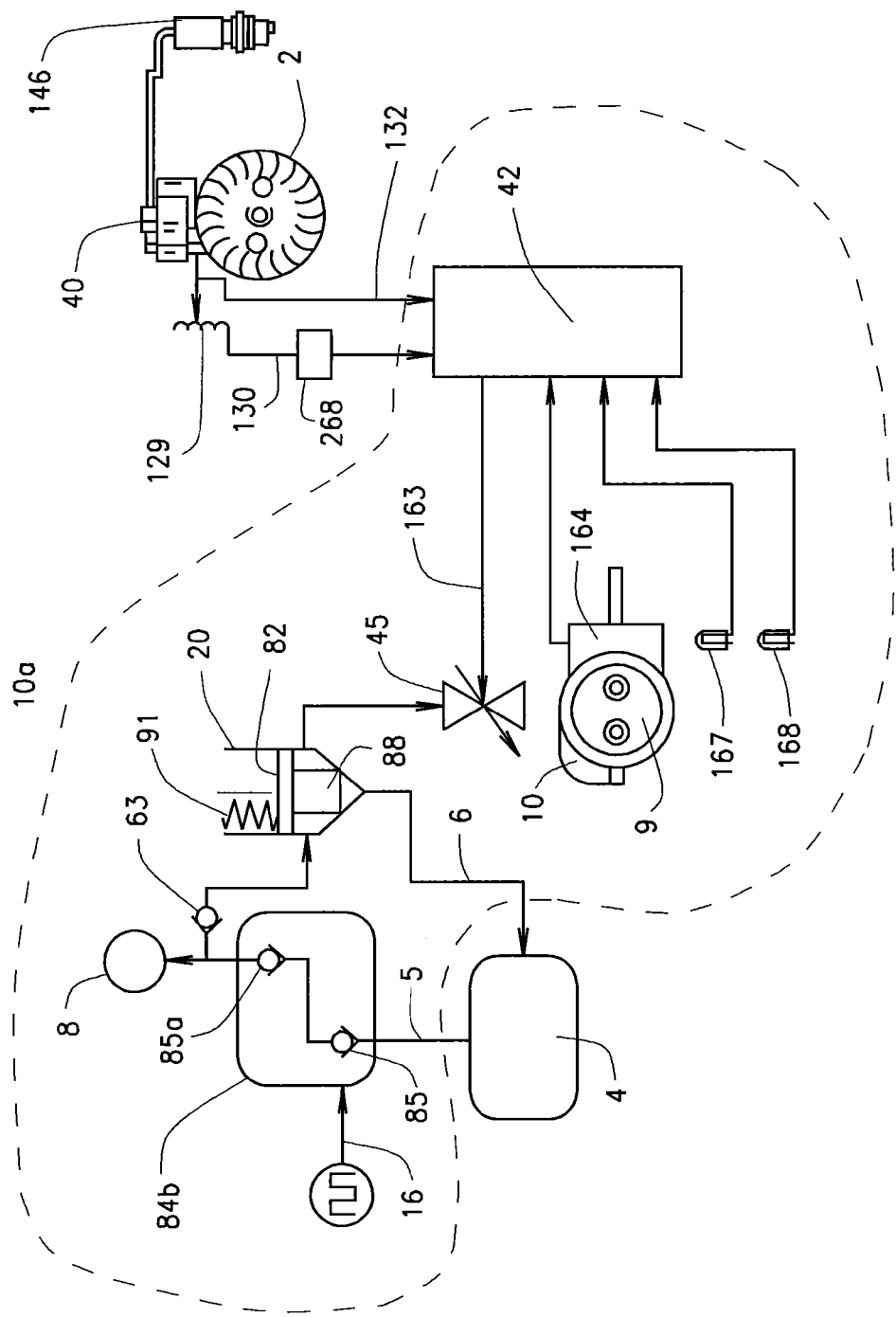
FIG. 30 is a block diagram view of another fuel system with a battery charging system.
Figure 31:
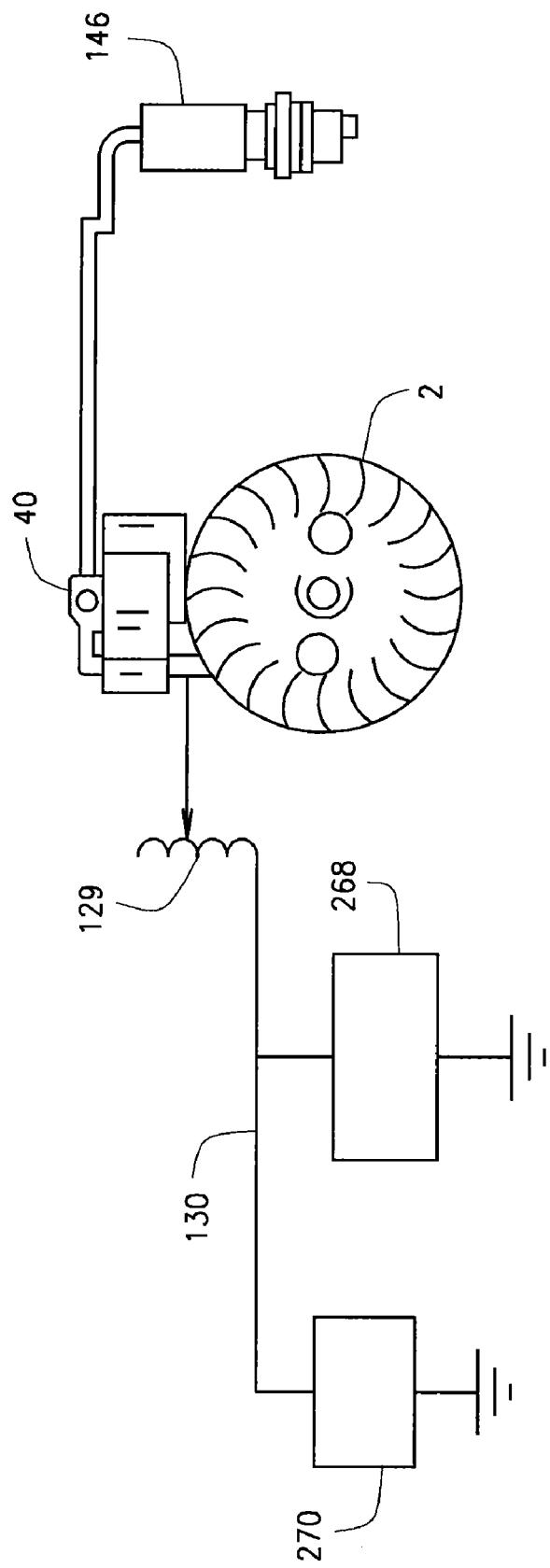
FIG. 31 is block diagram view of a battery charging system.

Referring to FIGS. 30 and 31, the ignition module 40 may also be used to charge a battery 268 in addition to powering the ECU 42 and the fuel injector 45. As shown in FIGS. 6-8, the ignition module 40 preferably has two legs 121*a*, 121*b* mounted adjacent to the flywheel 2. A power generation coil assembly 129 may be mounted on the first leg 121*a*, and a transformer assembly 123 may be mounted on the second leg 121*b*. As shown in FIG. 30, the power generation coil assembly 129 may be used to charge a battery 268 by connecting the power lead 130 to the battery 268. The battery 268 may also be connected to the ECU 42, if desired, to provide power to the ECU 42 and the fuel injector 45 from the battery 268. As shown in FIG. 31, the ignition module 40 may also be used in an internal combustion engine to provide power for a battery 268 and other loads 270. As shown, the power lead 130 from the power generation coil assembly 129 may be connected to a battery 268 and a load 270. Thus, during operation, the power generation coil assembly 129 may charge the battery 268. The load 270 may be one or more electrical loads connected to the circuit, such as an ECU, a fuel injector, lights, motors or a starter. For example, the ignition module 40 may be used in an internal combustion engine system with an electric start option with or without a fuel injection system. Thus, the battery 268 may be used when the internal combustion engine is off to power a electric starter to more easily start the engine.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense. Merely by way of example and not of limitation, those skilled in the art will recognize the various components may be substituted for the preferred components described. For example, check valves may be used in place of the fuel pressure regulator described. The design silhouette of the components shown in the drawings may vary in other embodiments of the invention. As indicated, aspects of the disclosure may find use in other applications of a related nature. For example, motor scooters and mopeds have engines which may successfully incorporate the inventive principles discussed above. These variations are merely illustrative.

The invention claimed is:

1. A fuel system (18) for an internal combustion engine including an engine block (12), at least one combustion chamber (14) associated with the engine block, at least one piston (11) mounted for movement within the chamber (14), a shaft (7) driven by the at least one piston (11), and a flywheel (2) mounted to and rotatable with the shaft; comprising:

a throttle body (10) mounted to the engine, the throttle body having a plurality of openings in it, the openings serving to route fuel to the at least one combustion chamber (14);

a fuel pump (84*b*) mounted to the throttle body (10);

a fuel pressure regulator (20) associated with the fuel pump (84*b*) and mounted to the throttle body (10);

an electronic control unit (ECU) (42) mounted to the throttle body (10), the electronic control unit (42) being operatively connected to a fuel injector (45) for injecting fuel into the at least one combustion chamber;

a fuel injector (45) mounted to the throttle body (10);

an air purge pump (29) mounted to the throttle body (10); and an ignition module and power generating assembly (40) operatively associated the flywheel (2) of the engine (1), the power generating assembly producing sufficient electrical power for operating the injection system along with associated input signals to the electronic control unit (42) for determining ignition and injector triggering.

2. In a fuel system (18) for a small internal combustion engine having an engine block (12), at least one combustion chamber (14) associated with the engine block (12), at least one piston (11) mounted for movement within the at least one chamber (14), a shaft (7) driven by the at least one piston (11), a flywheel (2) mounted to and rotatable with the shaft (7) and at least on fuel injector (45) associated with the engine (1), the improvement which comprises a throttle body (10) mounted to the engine (1), and a fuel pump (84*b*) integral with the throttle body (10), the throttle body (10) having a fuel circuit (10*a*) associated with it for delivering fuel to the at least one fuel injector (45), the fuel injector including a magnetic core (34) an electrical coil (43) mounted to the core (34), an upper body (25 sixed to receive the motor can (30), a lower body (33) having an inlet opening (39) operatively connected to the fuel circuit and an outlet (105) operatively connected to the at least one combustion chamber (14), the lower body being mounted to and fixed in position to the upper body (25) in the assembled position of the injector (45), a spring (44) and a pin (46) positioned between the lower body (33) and the motor can (30), the pin (46) being movable with respect to the magnetic forces acting on it from the coil (43), the coil (43) being electrically connected to the electronic control unit (42), wherein assembly of the injector allows the motor can 30 and Pin 46 to be adjusted with respect to one another by means of the internal threaded section 48 to define a first position (closed), and a second open position by adjustment of the motor can 30 to define both a second position and the distance of travel for the pin 46.

3. In a fuel system (18) for an internal combustion engine (1) having an engine block (12), at least one cylinder (15) associated with the engine (1), at least one piston (11) mounted for movement within the cylinder (15), a shaft (7) driven by the at least one piston (11), a flywheel (2) mounted to the shaft (7) and a fuel circuit (10*a*) for supplying fuel to the cylinder (15), the improvement which comprises a fuel injector (45) capable of delivering fuel in less than 4 ms at an engine speed of less than 12,500 revolutions per minute, the fuel injector (45) further including a motor can (30) enclosing a magnetic core (34), an electrical coil (43) mounted to the core (34), an upper body (25) sized to receive the motor can (30), a lower body (33) having an inlet (34) operatively connected to the fuel circuit and an outlet (105) operatively connected to the at least one cylinder (15), the lower body (33) being mounted to and fixed in position to the upper body (25) in the assembled position of the injector (45), a spring (44) and pin (46) positioned between the lower body (33) and the motor can (30), the spring (44) acting on the pin (46) normally to position the pin (46) toward the outlet (105) of the lower body (33).

4. In a fuel system for a small internal combustion engine (1) having an engine block (12), at least one combustion chamber (14) associated with the engine (1), at least one piston (11) mounted for movement within the combustion chamber, a shaft (7) driven by the at least one piston (11), and a flywheel (2) mounted to the shaft (7), and at least one fuel injector (45), the improvement which comprises an electronic control unit (42), the electronic control unit (42) being operable to electrically control a fuel injector (45) for the fuel system (18), the electronic control (42) unit including a microprocessor (160), a non-volatile memory for a control algorithm, and signal conditioning circuits, the electronic control unit being mounted to a throttle body (10), and a throttle body mounted to the engine (1) wherein the electronic control unit determines a speed of the engine (216), determines whether the speed of the engine is greater than a maximum speed (218), determines whether the speed of the engine is greater than an upper limit speed, the upper limit speed being greater than the maximum speed (220); increases fuel flow to the engine if the speed of the engine is greater than the maximum speed and less than the upper limit speed (224), slows the speed of the engine by shutting off the fuel flow to the engine and stopping the ignition timing to prevent the speed of the engine from exceeding the upper limit speed if the speed of the engine is greater than the upper limit speed (222), and makes no change to the fuel flow in response to the testing steps (218, 220) if the speed of the engine is less than the maximum speed (216, 218).

5. A fuel circuit for an internal combustion engine (1) comprising:
   a throttle body (10) including a housing (100), the housing (100) part having at least one channel formed in it to deliver fuel to a fuel injector (45);
   a throttle plate (9) mounted to the throttle body (10);
   a fuel injector (45) positioned with respect to the throttle plate (9) to enable the injector to deliver fuel to the combustion chamber (11);
   a diaphragm mounted to the throttle body with a first side adapted to alternately receive a vacuum and a positive pressure and a second side adapted to draw and expel fuel in response to the vacuum and positive pressure; and
   an inlet disk valve disposed with the housing, fuel being pulled through the inlet disk valve by the second side of the diaphragm;
   wherein the inlet disk valve comprises an inlet opening disposed away from the diaphragm, a disk comprising a first side and a second side, the first side being adapted to seal the inlet opening, and a spring disposed against the second side of the disk adapted to bias the disk against the inlet opening.

6. A method of adjusting the operational position of a fuel injector (45) for an internal combustion engine (1) comprising the steps of:
   providing a fuel injector (45) having an upper body and a lower body (25), the upper body (25) including a motor can (30) movable with respect to the lower body (25);
   advancing the motor can (30) to define a first bottomed position with respect to the lower body (25);
   rotating the motor can (30) away from the bottomed position to define an operational range of motion for the injector (45).

7. A throttle body (10) for an internal combustion engine comprising:
   a housing (100), the housing (100) having a plurality of channels formed in it, at least one of said channels operating to deliver fuel to a fuel injector (45);
   an electronic control unit (42) mounted to the throttle body (10);
   a throttle plate (9) operatively connected to the electronic control unit (42), the throttle plate (9) including a shaft (90) having a first end and a second end, one of said first and of said second ends of the shaft (90) being operatively connected to the electronic control unit (42) so as to provide a throttle position indication to the electronic control unit (42); and
   a fuel injector (45) attached to the engine and electronically connected to the electronic control unit.

8. In a fuel system for a internal combustion engine having an engine block (12), at least one cylinder (15) associated with the engine, at least one piston (11) mounted for movement within the cylinder (15), a shaft (7) driven by the at least one piston, a flywheel (2) mounted to the shaft, the improvement which consists essentially of the integration of the components required to operate a fuel injection system (10a) into a throttle body (10), the throttle body (10) having a first plurality of parts associated with it, and an ignition module (40), the ignition module having a second plurality of parts associated with it, the ignition module (40) being operatively connected to the throttle body (10) for engine operation. 49; the electronic control unit (42) further includes an intake air temperature sensor (167) adapted to receive intake air temperature for the engine, the intake air temperature sensor (167) being operatively connected to a microprocessor (160), and a microprocessor (160) associated with the electronic control unit (42), the throttle body having a plurality of passages formed in it, the one of said plurality of passages being provided for intake air temperature measurement, and wherein the electronic control unit (42) further includes a diagnostic port (50) for permitting external communications with the electronic control unit (42).

9. A method for starting a rope pull start internal combustion engine having a flywheel (2), a fuel injection system, an electronic control (42) unit for operating the fuel injection system, the electronic control unit (42) having a smart choke algorithm and a run algorithm associated with it, and an ignition module (40) for detecting rotation of the flywheel (2) comprising:
   pulling the rope (3) to cause rotation of flywheel (2);
   generating a power signal in the ignition module (40);
   transferring power from the ignition module (40) to the electronic control unit (42);
   starting a smart choke algorithm in the electronic control unit (42);
   providing a throttle position indication (13) to the smart choke algorithm;
   providing an intake air temperature (167) indication to the smart choke algorithm;
   providing an engine temperature (168) indication to the smart choke algorithm;
   utilizing the sensor inputs to indicate a point in a look up table to determine the on time for the fuel injection system (10a);
   applying fuel from the fuel injection system (10a) to the engine based on the lookup table values for starting the engine prior to the completion of the loading of the run algorithm; and
   completing the run algorithm loading and transferring the fuel injection system operation from the smart choke algorithm to the run algorithm.

10. A method for starting a rope pull start internal combustion engine having a flywheel (2), a fuel injection system (10a), an electronic control unit (42) for operating the fuel injection system (10a), the electronic control (42) unit having a smart choke algorithm and a run algorithm and an ignition module (40) for detecting rotation of the flywheel (2) comprising;
   detecting a first generated electrical pulse;
   applying a smart choke algorithm to determine the application of fuel from the fuel injection system (10a) to the engine when the electronic control unit (42) response time from first generated pulse to first required fuel output is less than the time required for the electronic control unit to load the run algorithm.

11. A method of regulating fuel delivery in a fuel system (18) for operating an internal combustion engine, by changing fuel quantity available to the engine for maximizing engine efficiency at any rpm, load and throttle position, the engine including an engine block (12), at least one cylinder

(15) associated with the engine, at least one piston (11) mounted for movement within the cylinder (15), a shaft (7) driven by the at least one piston (11) a flywheel (2) mounted to the shaft (7), a throttle body (10) having an electronic control unit (42) associated with it, and an ignition module (40), the ignition module being operatively arranged to detect rotation of the fly wheel (2) and being electrically connected to the electronic control unit (42), comprising the steps of:
- (a) running the engine;
- (b) selecting a number of revolutions to average;
- (c) establishing a first and second rpm value;
- (d) selecting a rpm deviation range;
- (e) determining the difference between first and second rpm values;
- (f) determining if the difference between first and second rpm values is greater than preset deviation range and if so proceeding with adjusting the fuel injection quantity;
- (g) adjusting fuel quantity by one of a increment or decrement amount;
- (h) starting a hunting loop;
- (i) observing whether the last operation conducted on the fuel regulating valve was an increment or a decrement for fuel flow through the valve;
- (j) incrementing fuel flow if the rpm is higher and the last operation was an increment;
- (k) decrementing fuel flow if rpm is higher and the last operation was a decrement;
- (l) incrementing fuel flow if the rpm is lower and the last operation was a decrement;
- (m) decrementing fuel flow if the rpm is lower and the last operation was an increment;
- (n) returning to rpm difference determination step; and
- (o) continuing the use of rpm as a control to operate the internal combustion engine at all normal operating conditions of the internal combustion engine and to control engine operation during the entire time of that operation.

12. A method of determining cycle recognition in an internal combustion engine, the engine including an engine block (12), at least one cylinder (15) associated with the engine, at least one piston (11) mounted for movement within the cylinder (15), a shaft (7) driven by the at least one piston (11), a flywheel (2) mounted to the shaft (7), a throttle body (10) having an electronic control unit (42) associated with it, and an ignition module (40), the ignition module being operatively arranged to detect rotation of the fly wheel (2) and being electrically connected to the electronic control unit (42), comprising the steps of:
- (a) rotating the flywheel so as to cause the magnets within the flywheel (2) to pass the first and second leg (121a, 121b) of the ignition module thereby a generating a first pulse as the magnet passes the first leg and a second pulse as the magnet passes the second leg (121a, 121b);
- (b) calculating the interval between first and second pulse to establish a first interval;
- (c) generating a third pulse when the flywheel (2) again passes the first leg (121a, 121b) of the ignition module (40);
- (d) calculate the interval between the second and third pulses to determine a second interval, comparing the first and second intervals to determine the greater time interval;
- (e) detecting a pulse following the third pulse; and
- (f) determining the time interval between the third pulse and the succeeding pulses to determine whether the time interval was greater than the reference interval.

13. A fuel system for a small internal combustion engine' comprising:
- a crankcase powered fuel pump (84b) having an input side and an output side;
- a pair of check valves (85a, 85b) operatively connected to the output side of the fuel pump;
- a purger bulb (8) positioned in the fuel system in relation to the fuel pump so as to require only one additional check valve (63) to direct fuel properly in the fuel system; and
- said one additional check valve (63) being operatively connected to the purger bulb (8).

14. A fuel system for a small internal combustion engine (1) having an engine block (12) at least one combustion chamber (14) associated with the engine block (12), at least one piston (11) mounted for movement in the chamber (14), a shaft (7) driven by said at least one piston (11), the engine (1) having a crankcase enclosing the shaft, whereby movement of the piston (11) causes varying pressure pulsations in the crankcase, comprising:
- an injector (45) adapted to provide fuel to the combustion chamber (14); a crankcase pulsation powered pump (84b) for supplying fuel to said fuel injector;
- a throttle body (10) mounted to said engine, said pump being mounted to said throttle body; and
- a purger bulb (8) mounted to the throttle body.

15. A fuel system for an internal combustion engine having an engine block (12), at least one cylinder (15) associated with the engine, at least one piston (11) mounted for movement within the cylinder (15), a shaft (7) driven by the at least one piston (11), a flywheel (2) mounted to the shaft (7), including the integration of the components required to operate the fuel system into two groups, which comprises:
- a throttle body (10), the throttle body having a first plurality of parts associated with it; the first plurality of parts including an electronic control unit mounted to the throttle body, the electronic control unit further includes an intake air temperature sensor adapted to receive intake air temperature of the engine, the intake air temperature sensor being operatively connected to a microprocessor, and a microprocessor associated with the electronic control unit, the throttle body have a plurality of passages formed in it, on of said plurality of passages being provided or intake air temperature measurement, and a diagnostic port for permitting external communications with the electronic control unit; and
- an ignition module (40), the ignition module having a second plurality of parts associated with it, the ignition module being operatively connected to the throttle body for engine operation.

16. An internal combustion engine, comprising:
- a flywheel (2) comprising a magnet attached thereto;
- an ignition module (40) mounted adjacent the flywheel (2), the ignition module (40) comprising a first leg (121a) and a second leg (121b) wherein a power generation coil assembly (129) is mounted on the first leg (121a) and a transformer assembly (123) is mounted on the second leg (121b);
- a battery (268) connected to the power generation coil assembly (129); and
- an electronic control unit (ECU) electrically connected to the ignition module, wherein the ECU controls operation of the internal combustion engine during normal operation of the engine.

* * * * *